(12) United States Patent
Dorrell et al.

(10) Patent No.: US 7,551,797 B2
(45) Date of Patent: Jun. 23, 2009

(54) WHITE BALANCE ADJUSTMENT

(75) Inventors: Andrew James Dorrell, East Blaxland (AU); Stuart William Perry, Artarmon (AU); Woei Chan, Darlinghurst (AU)

(73) Assignee: Canon Kabushiki Kaisha, Tokyo (JP)

( * ) Notice: Subject to any disclaimer, the term of this patent is extended or adjusted under 35 U.S.C. 154(b) by 591 days.

(21) Appl. No.: 11/191,042

(22) Filed: Jul. 28, 2005

(65) Prior Publication Data

US 2006/0050335 A1    Mar. 9, 2006

(30) Foreign Application Priority Data

Aug. 5, 2004   (AU)   .............................. 2004904409
Oct. 18, 2004  (AU)   .............................. 2004906020
Nov. 23, 2004  (AU)   .............................. 2004906703

(51) Int. Cl.
*G06K 9/40*    (2006.01)
*H04N 9/73*    (2006.01)
*H04N 1/46*    (2006.01)
*G03B 15/02*   (2006.01)

(52) U.S. Cl. ..................... 382/274; 348/224.1; 358/516; 396/61

(58) Field of Classification Search ................. 382/162, 382/254, 274–275; 396/61, 155, 158, 176, 396/179; 348/223.1, 224.1, 239, 370, 371, 348/376–377; 358/516, 520

See application file for complete search history.

(56) References Cited

U.S. PATENT DOCUMENTS

| | | | |
|---|---|---|---|
| 5,568,194 A | 10/1996 | Abe | .......................... 348/223 |
| 5,808,681 A | 9/1998 | Kitajima | ..................... 348/371 |
| 6,546,203 B2 | 4/2003 | Hofer | .......................... 396/155 |
| 6,718,051 B1 * | 4/2004 | Eschbach | .................... 382/117 |
| 6,728,401 B1 * | 4/2004 | Hardeberg | .................. 382/167 |
| 6,859,565 B2 * | 2/2005 | Baron | ........................ 382/275 |
| 2002/0118967 A1 * | 8/2002 | Funston | ..................... 396/155 |
| 2003/0151679 A1 | 8/2003 | Amerson et al. | ......... 348/231.6 |
| 2004/0145674 A1 | 7/2004 | Hoppe et al. | ................ 348/371 |
| 2005/0140801 A1 * | 6/2005 | Prilutsky et al. | ............ 348/239 |
| 2006/0008171 A1 * | 1/2006 | Petschnigg et al. | .......... 382/254 |

OTHER PUBLICATIONS

DiCarlo, et al., "Illuminating Illumination", Ninth Color Imaging Conference, pp. 27-34, 2001.
Petschnigg, et al., "Digital Photography with Flash and No-Flash Image Pairs," ACM Transactions on Graphics (TOG), vol. 23, Issue 3, pp. 664-672 (Aug. 2004).

* cited by examiner

*Primary Examiner*—Kanji Patel
(74) *Attorney, Agent, or Firm*—Fitzpatrick, Cella, Harper & Scinto

(57) ABSTRACT

A method (100) of generating a digital image of a scene is disclosed. The method (100) is particularly advantageous in situations where a light source illuminating the scene is unknown. The method (100) allows post-capture control over flash illuminant and ambient illuminant used in generating the image. The method (100) may also be used to provide a synthetic fill flash effect. The method (100) is particularly advantageous in situations where an ambient light source illuminating the scene differs in spectral character from that of a flash illuminant used to capture an image of the scene.

9 Claims, 21 Drawing Sheets

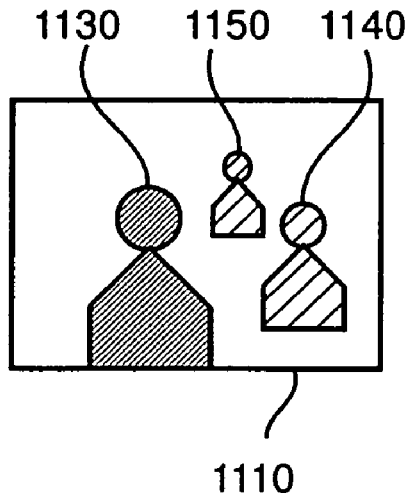
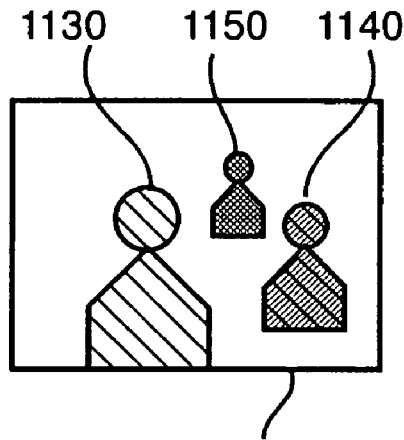
Fig. 11A  Fig. 11B
Legend for Figs. 11A and 11B
 Well exposed by ambient illumination
 Poorly exposed by ambient illumination
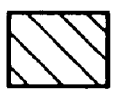 Well exposed by flash illumination
 Poorly exposed by flash illumination

WHITE BALANCE ADJUSTMENT

CROSS-REFERENCE TO RELATED PATENT APPLICATIONS

This application claims the right of priority under 35 U.S.C. § 119 based on Australian Patent Application No. 2004904409, filed 5 Aug. 2004, Australian Patent Application No. 2004906020, filed 18 Oct. 2004, and Australian Patent Application No. 2004906703, filed 23 Nov. 2004, which are incorporated by reference herein in their entirety as if fully set forth herein.

FIELD OF THE INVENTION

The present invention relates generally to the field of photography and, in particular, to a method and apparatus for generating a digital image of a scene. The present invention also relates to a computer program product including a computer readable medium having recorded thereon a computer program for generating a digital image of a scene.

BACKGROUND

When viewing a scene, the human eye automatically factors out the color of an illuminating light source so that colors of objects in the scene appear as the colors would appear under a white light source. This process is known as "chromatic adaptation" or "white balancing." For digital cameras, if white balancing is not performed well then captured images may appear to have a color bias or some colors in a captured image may not appear natural compared to other colors in the captured image. Color bias due to poor white balancing is one of the most common problems cited by photographers when assessing the quality of images captured using digital cameras.

Many conventional cameras provide an automatic white balance mode, referred to as "single image automatic white balancing", which automatically adjusts white balance using one of many conventional methods. One such conventional white balancing method is known as "gray-world". The gray-world method works well in many environments but often performs badly in low or unusual light conditions.

For photographic conditions in which conventional white balancing methods do not work, it is common for cameras to provide a set of special modes. These special modes are based on one or more models, such as incandescent light, fluorescent light, full sun, and shade, for example. However, even special modes sometimes give poor results if the ambient light in a scene does not fit the model well. For example, special modes often give poor results in photographic conditions such as light from low wattage incandescent lamps, dusk and dawn, indoor settings where the light is colored, or where there may be multiple illuminant types of light present.

Conventional cameras often include a sensor known as a White Balance (WB) Sensor mounted on the camera to detect the color of the light illuminating a scene to be captured. Such sensors aid a photographer or the camera (i.e., if the camera is working in an automatic mode), to select a special mode depending on the light illuminating the scene to be captured. However, such sensors only describe light striking the sensor and this may not correspond to the light illuminating the scene to be captured.

Some conventional methods for adjusting white balance require a user to capture an image of a white object such as a sheet of paper. These methods tend to be problematic as their result is dependent on being able to photograph a white surface under the same illuminant as a subject to be photographed.

The special modes described above are also prone to causing user error especially in a situation where a mode is selected by the user based on particular photographic conditions and then the user forgets to change the mode when moving to a different location where the conditions may be different. The use of a flash device may reduce white balance problems in many such situations. However, the use of a flash may also adversely affect the appearance of a captured image. This leaves a significant class of photographic conditions where color balancing remains problematic.

The use of fill flash in photography is well known. Fill flash is a light source providing supplementary illuminant to the normal flash illuminant provided by most conventional cameras. Fill flash is often used to shine a little supplementary light in certain regions of a scene being captured or to provide extra light for the entire scene.

The amount of flash illuminant used when capturing an image is difficult to control. In particular, the contribution of the fill flash to a scene can not easily be adjusted at a post-capture stage to obtain an optimum illumination level for the scene to be captured.

In a situation with mixed lighting, it may be difficult to control and change the color of flash illuminant used during an image capture process in order to match the color of the ambient light of the scene being captured. Similarly, at the post-capture stage it may be difficult to isolate and change the color of the fill flash component of the flash illuminant when adjusting color balance.

Some photographers have suggested a post capture flash tuning process as an application of recent advances in High Dynamic range image rendering. However, a problem with such an approach is that rendering is considered after application of the flash illuminant. As such, there is no control over the relative proportions of flash and ambient illuminant used to light the scene being captured.

The relative proportions of flash and ambient illuminant used to light the scene being captured is important when determining the optimum illumination level for the captured image of the scene. For example, FIG. 11A shows an image 1110 of a scene captured without any flash illuminant. The image 1110 includes three subjects 1130, 1140 and 1150. In the image 1110, the foreground subject 1130 is in shadow and is therefore poorly exposed (i.e., too little light from the foreground subject 1130 was captured) compared to the subject 1140 at mid distance and the subject 1150 at a longer distance in the image 1130. In contrast, FIG. 11B shows a second image 1120 of the same scene as FIG. 11A, captured with a supplementary flash illuminant (i.e., fill flash). One problem with the image 1120 of FIG. 11B is that the foreground subject 1130 may be relatively overexposed (i.e., too much light from the subject 1130 is captured) relative to the mid-distant subject 1140 and the distant subject 1150. Another problem with the image 1120 of FIG. 11B captured with fill flash is that the foreground subject 1130 is illuminated by flash illuminant whereas the other subjects 1150 and 1140 are illuminated by a mix of ambient and flash illuminant. If the color of the flash illuminant is different to the color of the ambient illuminant then the white balance for at least some of the subjects 1130, 1140 and 1150 may often appear incorrect.

None of the conventional methods of generating digital images allow post-capture control over the flash illuminant and ambient illuminant in a captured image of a scene while addressing white balance problems.

Thus, a need clearly exists for an improved method of generating a digital image of a scene.

SUMMARY

It is an object of the present invention to substantially overcome, or at least ameliorate, one or more disadvantages of existing arrangements.

According to one aspect of the present invention there is provided a method of setting the white balance of a first captured image representing a scene, the first image being captured at ambient light, said method comprising the steps of:

capturing a second image of the scene using a flash illuminant;

removing from the second image an ambient light contribution to produce a modified second image;

comparing colors in the first image captured at ambient light with colors of the modified second image to determine a color transform; and adjusting the white balance of the first image using the determined color transform.

According to another aspect of the present invention there is provided a method of setting the white balance of a first captured image representing a scene, the first image being captured at ambient light, said method comprising the steps of:

capturing a second image of the scene using a flash illuminant;

comparing colors in the first image captured at ambient light with colors of the second image to determine a color transform; and adjusting the white balance of the first image using the determined color transform.

According to still another aspect of the present invention there is provided a method of adjusting the white balance of a first captured image representing a scene, the first image being captured at ambient light, said method comprising the steps of:

capturing a second image of the scene using a flash illuminant;

white balancing the captured second image according to predetermined properties of the flash illuminant and the scene;

determining a plurality of color transform values to the white balanced second image from corresponding pixel values of said first image; and adjusting the white balance of said first image using the determined color transform values.

According to still another aspect of the present invention there is provided an apparatus for setting the white balance of a first captured image representing a scene, the first image being captured at ambient light, the apparatus comprising:

capturing means for capturing a second image of the scene using a flash illuminant;

comparing means for comparing colors in the first image captured at ambient light with colors of the second image to determine a color transform; and adjusting means for adjusting the white balance of the first image using the determined color transform.

According to still another aspect of the present invention there is provided an apparatus for adjusting the white balance of a first captured image representing a scene, the first image being captured at ambient light, the apparatus comprising:

capturing means for capturing a second image of the scene using a flash illuminant;

white balancing means for white balancing the captured second image according to predetermined properties of the flash illuminant and the scene;

color transform value determining means for determining a plurality of color transform values to the white balanced second image from corresponding pixel values of said first image; and adjusting means for adjusting the white balance of said first image using the determined color transform values.

According to still another aspect of the present invention there is provided a computer program for setting the white balance of a first captured image representing a scene, the first image being captured at ambient light, the program comprising:

code for capturing a second image of the scene using a flash illuminant;

code for comparing colors in the first image captured at ambient light with colors of the second image to determine a color transform; and code for adjusting the white balance of the first image using the determined color transform.

According to still another aspect of the present invention there is provided a computer program for adjusting the white balance of a first captured image representing a scene, the first image being captured at ambient light, the program comprising:

code for capturing a second image of the scene using a flash illuminant;

code for white balancing the captured second image according to predetermined properties of the flash illuminant and the scene;

code for determining a plurality of color transform values to the white balanced second image from corresponding pixel values of said first image; and code for adjusting the white balance of said first image using the determined color transform values.

According to still another aspect of the present invention there is provided a computer program product having a computer readable medium having a computer program recorded therein for setting the white balance of a first captured image representing a scene, the first image being captured at ambient light, said computer program product comprising:

computer program code means for capturing a second image of the scene using a flash illuminant;

computer program code means for comparing colors in the first image captured at ambient light with colors of the second image to determine a color transform; and computer program code means for adjusting the white balance of the first image using the determined color transform.

According to still another aspect of the present invention there is provided a computer program product having a computer readable medium having a computer program recorded therein for adjusting the white balance of a first captured image representing a scene, the first image being captured at ambient light, said computer program product comprising:

computer program code means for capturing a second image of the scene using a flash illuminant;

computer program code means for white balancing the captured second image according to predetermined properties of the flash illuminant and the scene;

computer program code means for determining a plurality of color transform values to the white balanced second image from corresponding pixel values of said first image; and computer program code means for adjusting the white balance of said first image using the determined color transform values.

According to still another aspect of the present invention there is provided a method of generating a digital image of a scene, said method comprising the steps of:

capturing a first image of the scene at ambient light;

capturing a second image of the same scene using a flash illuminant;

forming a third image using said first and second images, said third image representing an image of the scene captured using the flash illuminant with any contribution of ambient light removed;

determining a first transform based on an analysis of said first and second images, said first transform being configured for matching the colour of pixels in said first image to pixels in said third image;

applying said first transform to said first image to form a fourth image; and combining said third and fourth images to generate said digital image.

According to still another aspect of the present invention there is provided an apparatus for generating a digital image of a scene, said apparatus comprising:

first capturing means for capturing a first image of the scene at ambient light;

second capturing means for capturing a second image of the same scene using a flash illuminant;

image forming means for forming a third image using said first and second images, said third image representing an image of the scene captured using the flash illuminant with any contribution from ambient light removed;

transform determining means for determining a first transform based on an analysis of said first and second images, said first transform being configured for matching the colour of pixels in said first image to pixels in said third image;

transform applying means for applying said first transform to said first image to form a fourth image; and image generating means for combining said third and fourth images to generate said digital image.

According to still another aspect of the present invention there is provided a computer program for generating a digital image of a scene, said program comprising:

code for capturing a first image of the scene at ambient light;

code for capturing a second image of the same scene using a flash illuminant;

code for forming a third image using said first and second images, said third image representing an image of the scene captured using the flash illuminant with any contribution from ambient light removed;

code for determining a first transform based on an analysis of said first and second images, said first transform being configured for matching the colour of pixels in said first image to pixels in said third image;

code for applying said first transform to said first image to form a fourth image; and code for combining said third and fourth images to generate said digital image.

According to still another aspect of the present invention there is provided a computer program product having a computer readable medium having a computer program recorded therein for generating a digital image of a scene, said computer program product comprising:

computer program code means for capturing a first image of the scene at ambient light;

computer program code means for capturing a second image of the same scene using a flash illuminant;

computer program code means for forming a third image using said first and second images, said third image representing an image of the scene captured using the flash illuminant with any contribution from ambient light removed;

computer program code means for determining a first transform based on an analysis of said first and second images, said first transform being configured for matching the colour of pixels in said first image to pixels in said third image;

computer program code means for applying said first transform to said first image to form a fourth image; and computer program code means for combining said third and fourth images to generate said digital image.

According to still another aspect of the present invention there is provided a method of processing a captured image of a scene, said method comprising the steps of:

determining photographic parameters of the scene; and establishing, if the parameters meet pre-defined criteria, flash-no-flash white balance information applicable to the captured image.

According to still another aspect of the present invention there is provided an apparatus for processing a captured image of a scene, said apparatus comprising:

means for determining photographic parameters of the scene; and means for establishing, if the parameters meet pre-defined criteria, flash-no-flash white balance information applicable to the captured image.

According to still another aspect of the present invention there is provided an apparatus for processing a captured image of a scene, said apparatus comprising:

a memory for storing a program; and a processor for executing the program, said program comprising:

code for determining photographic parameters of the scene; and code for establishing, if the parameters meet pre-defined criteria, flash-no-flash white balance information applicable to the captured image.

According to still another aspect of the present invention there is provided a computer program product including a computer readable medium having recorded thereon a computer program for directing a processor to execute a method for processing a captured image of a scene, said program comprising:

code for determining photographic parameters of the scene; and code for establishing, if the parameters meet pre-defined criteria, flash-no-flash white balance information applicable to the captured image.

According to still another aspect of the present invention there is provided a computer program for directing a processor to execute a method for processing a captured image of a scene, said program comprising:

code for determining photographic parameters of the scene; and code for establishing, if the parameters meet pre-defined criteria, flash-no-flash white balance information applicable to the captured image.

According to still another aspect of the present invention there is provided flash-no-flash white balance information determined using a method of processing a captured image of a scene, said method comprising the steps of:

determining photographic parameters of the scene; and establishing, if the parameters meet pre-defined criteria, said flash-no-flash white balance information applicable to the captured image.

According to still another aspect of the present invention there is provided an image processed using a method comprising the steps of:

determining photographic parameters of a scene; and establishing, if the parameters meet pre-defined criteria, flash-no-flash white balance information applicable to the image.

Other aspects of the invention are also disclosed.

BRIEF DESCRIPTION OF THE DRAWINGS

One or more embodiments of the present invention will now be described with reference to the drawings and appendices, in which:

FIG. 11A is a diagram showing an image of a scene, captured without any flash illuminant;

FIG. 11B shows a second image of the same scene as FIG. 11A, captured with a supplementary flash illuminant (i.e., fill flash);

DETAILED DESCRIPTION INCLUDING BEST MODE

Figure 1:
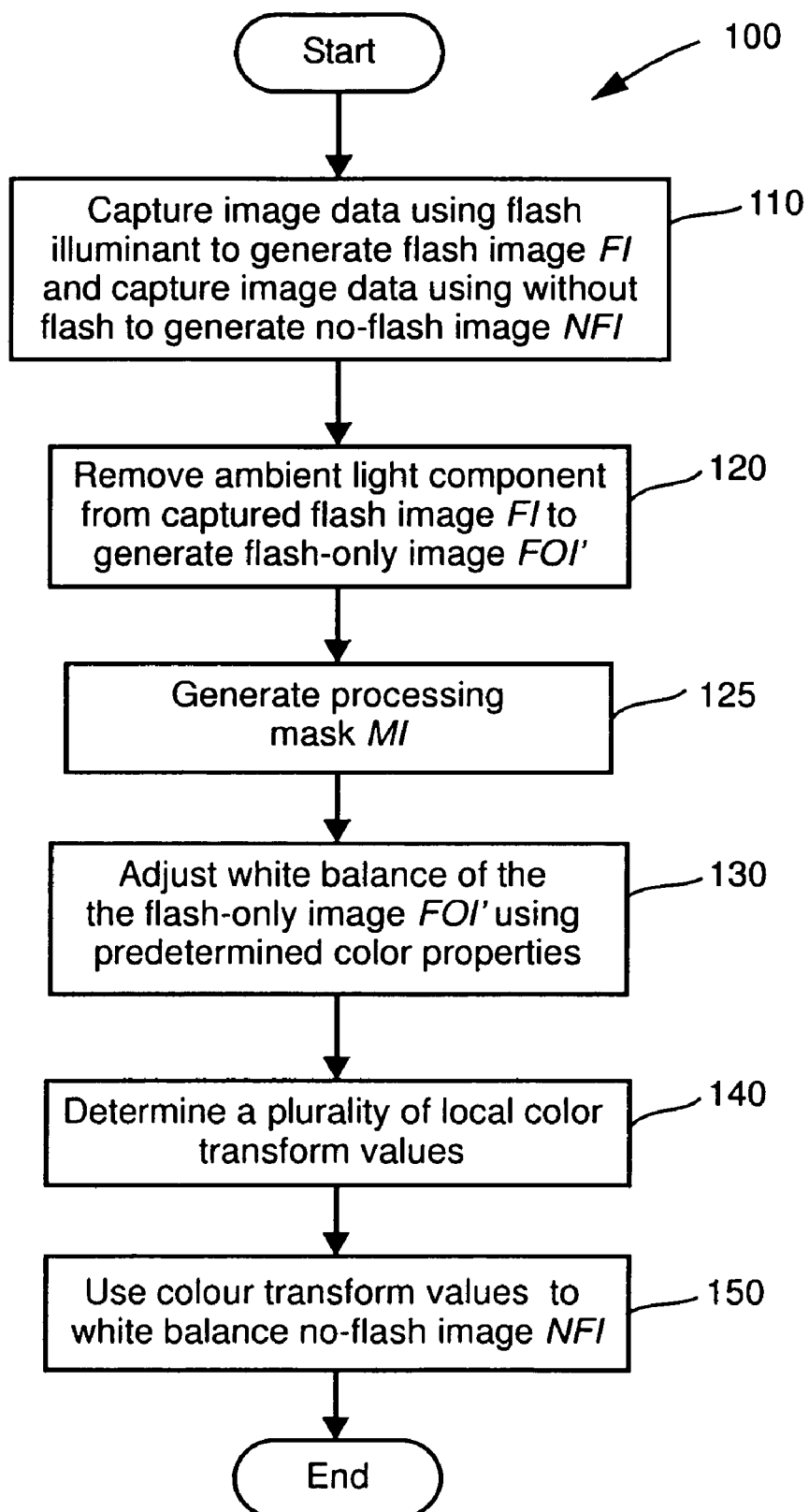
FIG. 1 is a flow diagram showing a method of generating a digital image of a scene, according to a first embodiment of the invention.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which form public knowledge through their respective publication and/or use. Such should not be interpreted as a representation by the present inventor(s) or patent applicant that such documents or devices in any way form part of the common general knowledge in the art.

A method 100 (see FIG. 1) of generating a digital image of a scene according to a first embodiment of the invention is described below with reference to FIGS. 1 to 17B. The method 100 is particularly advantageous in situations where a light source illuminating the scene is unknown. Another method 1200 (see FIG. 12) of generating a digital image of a scene is also described. The method 1200 allows post-capture control over flash illuminant and ambient illuminant used in generating the image. As will be described in detail below, the method 1200 may also be used to provide a synthetic fill flash effect. The method 100 is particularly advantageous in situations where an ambient light source illuminating the scene differs in spectral character from that of a flash illuminant used to capture an image of the scene.

The methods described herein do not require complicated mechanisms or significant changes to the construction of a camera or other apparatus used to implement the methods. The described methods may also be used without requiring a user to make manual adjustments to settings of the camera or other apparatus used to implement the methods.

Figure 7:
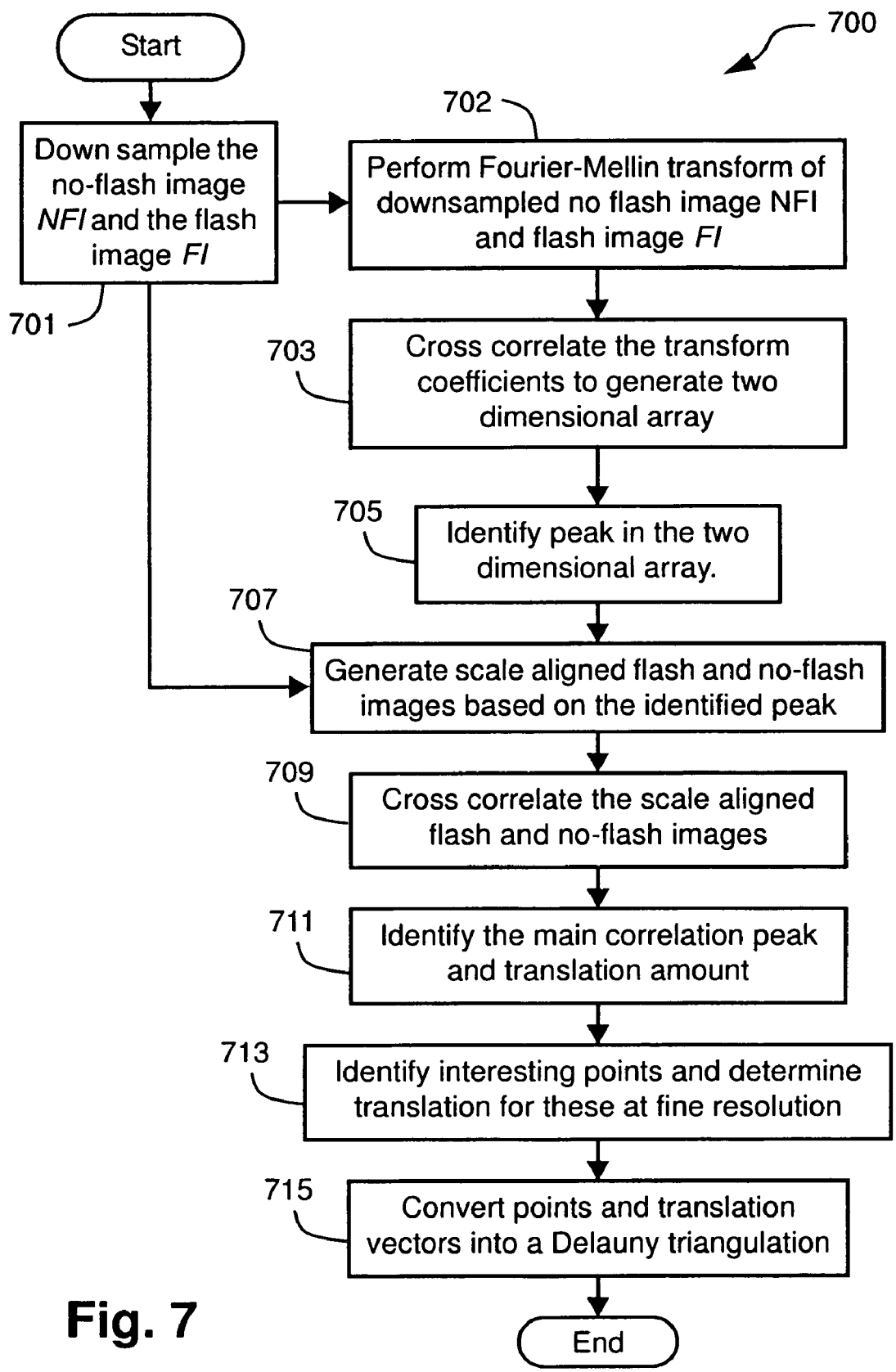
FIG. 7 is a flow diagram showing a method of determining registration information, as executed during the method of FIG. 2.
Figure 8:
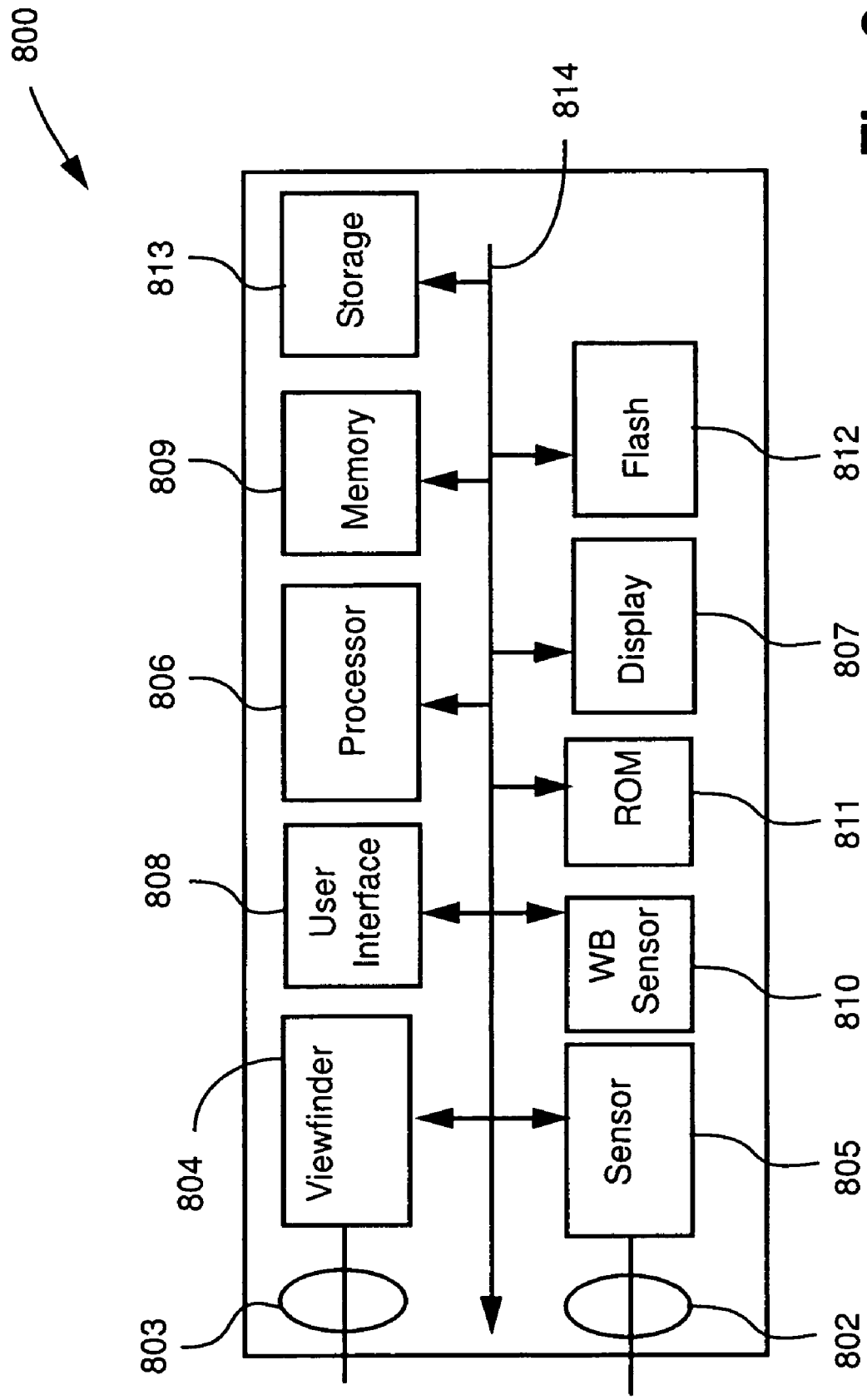
FIG. 8 is a schematic block diagram of a digital camera upon which arrangements described may be practiced.

The described methods may be practiced using a camera 800, such as that shown in FIG. 8 wherein the processes of FIGS. 1 to 7, 9 to 10 and 12 to 17B may be implemented as software, such as an application program executing within the camera 800. Alternatively, one or more of the steps of the described methods may be implemented using general purpose computing hardware (e.g., a personal computer (PC)) to process image data captured using the camera 800. Examples of computers on which the described arrangements may be practised include IBM-PC's and compatibles, Sun Sparcstations or alike computer systems evolved therefrom.

The steps of the described methods may be effected by instructions in software that are carried out by the camera 800 or general-purpose computer. The instructions may be formed as one or more code modules, each for performing one or more particular tasks. The software may also be divided into two separate parts, in which a first part performs the described methods and a second part manages a user interface between the first part and the user. The software may be stored in a computer readable medium, including the storage devices described below, for example. The software may be loaded into the camera 800 or general-purpose computer from the computer readable medium, and then executed by the camera 800. A computer readable medium having such software or computer program recorded on it is a computer program product. The use of the computer program product in the camera 800 or general-purpose computer effects an advantageous apparatus for implementing the described methods.

The digital camera 800 comprises input devices such as a view finder 804, image sensor 805, a user interface 808 and a white balance (WB) sensor 810, and output devices such as a display device 807 (e.g., Liquid Crystal Display (LCD)) and a flash device 812. The digital camera 800 typically includes at least one processor unit 806, and a memory unit 809, for example formed from semiconductor random access memory (RAM) and read only memory (ROM) 811. A hard disk drive or other non-volatile mass storage device 813 may also be provided. Typical examples of such a non-volatile mass storage device include compact flash (CF) memory and similar removable memory. The components 804 to 813 of the camera 800, typically communicate via an interconnected bus 814.

Typically, the application program implementing the described methods is resident in the ROM 811 and is read and controlled in its execution by the processor 806. Intermediate storage of the program may be accomplished using the semiconductor memory 809, possibly in concert with the hard disk drive 813. The application program may be loaded into the camera 800 and pre-stored in the ROM 811 by a manufacturer of the camera 800, for example. Alternatively, the application program may be loaded from computer readable media. For example, the application program may be supplied to the user encoded on a CD-ROM or floppy disk and loaded into the camera 800 via a serial link (not shown). The term "computer readable medium" as used herein refers to any storage medium that participates in providing instructions and/or data to the camera 800 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the camera 800.

The camera 800 also comprises a lens system 802 through which light from a scene to be photographed may be optically focused onto the image sensor 805. The image sensor 805 comprises a two-dimensional (2D) array of photosensitive elements (not shown), with each photosensitive element recording the intensity of light falling thereon. The recorded light intensity may be used to provide image pixel data representing the photographed scene. The provision of this image pixel data by the image sensor 805 is typically referred to as 'the capture' of image pixel data and the data is typically referred to as 'the captured' image pixel data. The photosensitive elements of the image sensor 805 may be of Charged Coupled Device (CCD) or Complementary Metal Oxide Semiconductor (CMOS) technology. The image pixel data captured by the image sensor 805 is passed to the processor 806. The processor 806 processes the image pixel data and may store the image data in the memory unit 809 or on the ROM 811.

Light from the scene may also be measured by the white balance (WB) sensor 810. The WB sensor 810 determines spectral characteristics of the light from the scene. Typically, these spectral characteristics are determined as a color temperature value.

The viewfinder 804 of the camera 800 allows a user to compose an image of the photographic scene to be captured, with the image being visible through a lens 803. In one implementation, the viewfinder 804 and image sensor 805 may share the same light path. The display device 807 may be controlled by the processor 806 to display a down-sampled version of the captured image pixel data.

The user interface 808 allows the user to control the camera 800, by selecting and setting various control parameters. The settings of the control parameters may be stored as one or more control parameter values in memory 809, for example. The display device 807 may also function as an interface to communicate current control parameters to the user. Such control parameters may include image storage format, shutter speed, aperture size, ISO sensitivity, white balance and exposure compensation. The control parameters may also include a noise reduction method, a specific metering mode and selection of an electronic flash.

Camera control parameters such as image storage format, white balance and exposure compensation affect how captured image pixel data is processed at a post-capture stage. Thus, the processor 806 identifies these control parameters as post-capture control parameters.

Camera control parameters such as aperture size, shutter speed, use of a flash, ISO sensitivity and focus length, affect the capturing of image pixel data pre-capture. Thus the processor 806 identifies these control parameters as pre-capture control parameters.

The user interface 808 comprises an automatic/manual setting key, a photographing mode setting key, shutter release button, zoom key and cursor key, none of which are shown in FIG. 8. The automatic/manual setting key may be used to set the camera 800 to "automatic" or "manual" for different modes of operation. The shutter release button is a switch that may be capable of distinguishing between a half depression and full depression. At half depression of the shutter release button, the camera 800 may be triggered to perform several operations to prepare for the capturing of pixel image data. Typically, when the automatic/manual setting key of the camera 800 is set to automatic, the processor 806 performs a metering operation to ensure that light from the scene to be photographed will be properly exposed, upon the shutter release button being depressed to half depression. In this instance, the processor 806 may also determine shutter speed and aperture size values, and corresponding camera control parameters may be set by the camera 800 automatically. The processor 806 may also invoke the WB sensor 810 to determine a color temperature value. If the processor 806 determines that there is not enough light being captured from the scene to be photographed, the processor 806 may choose to invoke a flash 812, as seen in FIG. 1. The camera 800 may also perform an automatic focus process to focus the lens system 802 upon the shutter release button being depressed to half depression. At full depression of the shutter release button, the camera 800 is triggered to capture image pixel data representing the photographic scene according to the camera control parameters.

The photographing mode setting key is a switch for manually changing the photographing mode. For example, the photographic mode may be set to portrait mode, landscape mode, close-up mode, action mode, program mode, aperture priority mode, shutter priority mode and depth of field mode.

The zoom key is a switch for operating the zoom lens 802 in order to set photographing magnification.

The cursor key of the user interface 808 may be used to change the value of various camera control parameters. For example, the cursor key may be used to toggle between different control parameter values under an options menu displayed on the display device 807.

The method 100 of generating a digital image of a scene will now be described with reference to FIG. 1. The method 100 may be implemented as software resident in the ROM 811 of the camera 800 and being executed by the processor 806.

In accordance with the method 100, two images of a scene are captured successively. One of the images is captured using the flash 812 to illuminate the scene while the other image is captured without the flash 812, using only the ambient illuminant of the scene. The duration of the interval between the capture of the two images is made as short as possible to reduce the complexity of subsequent registration, as will be explained in detail below. Registration is performed to match each point in the image captured with the flash 812 to a corresponding point in the image captured using only the ambient illuminant of the scene. The two images are corrected for shutter speed, aperture, and equivalent film speed setting so that stored pixel values representing the scene measure light intensity using the same scale.

As will be described in detail below, using the registration information determined, the image captured without the flash 812 is subtracted from the image captured with the flash 812, to create a flash-only image. The flash-only image represents the appearance of the scene if the scene was only illuminated with the flash 812 and not any external, ambient lighting. The effect of the spectrum of light provided by the flash 812 on the images is determined from spectral samples transmitted by the flash 812 to the camera 800 or by previously stored information about the flash. This enables the flash-only image to be white balanced to produce a corrected flash only image, which shows the scene without any color bias. A mask may also be determined. The mask indicates regions in both the image captured without the flash 812 and the flash-only image, which are neither underexposed (noisy) nor overexposed (saturated). The regions identified by the mask in the image captured without the flash 812 may be compared to the corrected flash-only image. The results of this comparison may then be used to determine a white point for the no-flash image. This white point information may be used to remove any color bias in the no-flash image to produce a corrected no-flash image with substantially similar color appearance to the corrected flash-only image.

Further, pixels from the white balanced flash-only image may be recombined with pixels from the white balanced no-flash image to form a new synthetic flash image. As a result of the white balance method outlined above the new synthetic fill flash image has a consistent color appearance in areas illuminated primarily by flash and the ambient illuminant. This results in a more natural looking image.

By adjusting the amount of corrected flash-only image that is recombined with the corrected no-flash image the user may control the mix of ambient light and flash illuminant to produce a synthetic flash image without having to capture a further image of the scene. The methods described herein allow the overall white balance of the scene to be automatically estimated and adjusted without loss of flash power. The method 100 also reduces the visible effect of specular highlights in the flash image.

The method 100 begins at step 110, where upon detecting the shutter release button being fully depressed, the processor 806 captures a first image of the scene using only the ambient illuminant of the scene (i.e., without using the flash 812). Prior to step 110, in response to the detection of the shutter release button being half pressed, the processor 806 may perform various operations and set various camera control parameters. Such operations may include detecting conditions external to the camera 800 at the scene for exposure metering and auto focusing the lens 802 to make sure the photographic scene or a subject of the scene is in focus. Based on the detected external conditions, the processor 806 may determine a set of control parameter values for capturing a photograph of the scene. Upon detecting the shutter release button being fully depressed, the processor 806 captures pixel image data representing the first image of the scene based on the intensity of light falling on each of the photosensitive elements of the image sensor 805. The pixel image data representing the first image is preferably buffered in memory 809 during subsequent processing but may be stored on the hard disk drive 813.

The processor 806 may also capture a second image of the scene using the illuminant provided by the flash 812. The camera 800 may measure the intensity and color of the ambient light using the WB sensor 810. The camera 800 may determine that the intensity and color of the ambient light have values outside a range of predetermined threshold values and, as a result, capture the pixel image data representing the second image. Alternatively, the pixel image data representing the second image may be captured as a result of user input (e.g., using the user interface 808)

The first image and the second image captured at step 110 may be referred to as an "image pair". A method 900 of capturing an image, as executed at step 110 will be described in detail below with reference to FIG. 9.

The first unprocessed image captured using only the ambient illuminant of the scene (i.e., without using the flash 812) will be referred to below as the no-flash image and be denoted by the symbol NFI. The demosaiced form of the no-flash image, which comprises red, green and blue color components at each pixel location is referred to as the reconstructed no-flash image and denoted by the symbol NFI'. The second unprocessed image captured using the illuminant provided by the flash 812 will be referred to below as the flash image FI. A demosaiced form of the flash image, which comprises red, green and blue color components at each pixel location, is multiplied by an exposure dependent value so that the resulting demosaiced form of the flash image measures light consistently with the no-flash image NFI. The resulting image demosaiced form of the flash image is also spatially transformed such the content of the resulting image is registered with the content of the no-flash image NFI. This registered image is referred to as the reconstructed scaled and registered flash image and denoted by the symbol FI'.

The time interval between the capture of the no-flash image NFI and the flash image FI is preferably minimized (e.g., less than 0.2 seconds). This reduces the difficulty in registering the flash image FI and the no-flash image NFI, as will be explained in detail below. The interval between successive capture of the flash image FI and the no-flash image NFI may be minimized by storing both of the captured images in memory 809 so that additional image processing (e.g., demosaicing) may be deferred until after both the flash image FI and no-flash image NFI are captured. In this instance, the memory 806 or a portion thereof may be configured as fast buffer memory. In one implementation, multiple readout circuits may be used to increase the speed of readout of the captured pixel image data from the sensor 805.

The method 100 continues at the next step 120, where the processor 806 removes the ambient light components from the captured flash image FI to generate a flash-only image, FOI'. The flash-only image, FOI', is an image representing the scene as the scene would have been captured if the flash 812 was the only source of illumination. The flash-only image, FOI', comprises red (R), green (G) and blue (B) data for each pixel location in a linear light color space of the camera 800. A method 200 of removing the ambient light components from the flash image FI to generate a flash-only image FOI', as executed at step 120, will be described in detail below with reference to FIG. 2.

The method 100 continues at the next step 125 where the processor 806 generates a binary processing mask, denoted MI. This processing mask MI contains non-zero values in pixel locations in which both the reconstructed no-flash image NFI' and the flash-only image FOI' are well exposed. The processing mask is used in a following step 140 to ensure that only pixels in locations for which a predetermined threshold level of exposure are used in white balancing. The determination of the processing mask is described in detail below.

At the next step 130, the white balance of the flash-only image FOI' is adjusted using predetermined color properties of the light provided by the flash 812, in the color space of the camera 800 to determine a corrected flash-only image FOI''. The color properties for a camera that is sensitive to a number, N, of spectral bands may be represented by N color factors. The N color factors represent the response of N color filters of the camera 800, to the light provided by the flash 812.

The adjustment of the white balance of the flash-only image FOI' may be performed by dividing the intensity of each pixel of the flash-only image FOI' in each color plane by a corresponding ratio. The ratio represents the ratio of a color factor determined for the flash 812 to a color factor of some predetermined standard illuminant. For example, assuming that the camera 800 is sensitive to three spectral bands denoted as red (R), green (G), and blue (B), and that "D50" is selected as the standard illuminant. In this instance, the color component values for a single pixel at location (x, y) of the corrected flash only FOI'' may be determined as follows:

$$FOI''(x, y)_r = FOI'(x, y)_r I_r^{D50} \div I_r^f \quad (1)$$

$$FOI''(x, y)_g = FOI'(x, y)_g I_g^{D50} \div I_g^f \quad (2)$$

$$FOI''(x, y)_b = FOI'(x, y)_b I_b^{D50} \div I_b^f \quad (3)$$

where FOI'(x, y)$_r$, FOI'(x, y)$_g$ and FOI'(x, y)$_b$ represent red, green and blue color component values, respectively, of a pixel at position (x, y) in the flash-only image, FOI'. The symbols FOI''(x, y)$_r$, FOI''(x, y)$_g$ and FOI''(x, y)$_b$ represent red, green, and blue color components, respectively, of a pixel at position (x, y) in the corrected (or white balanced) flash-only image, FOI''. The symbols $I_r^f$, $I_g^f$, and $I_b^f$ are color factors representing the response of the camera 800 to the light provided by the flash 812 (normalized to a luminance of unity) in the red, green, and blue spectral bands, respectively. The symbols $I_r^{D50}$, $I_g^{D50}$, and $I_b^{D50}$ are the color factors representing the response of the camera 800 to the standard "D50" illuminant (normalized to a luminance of unity) in the red, green, and blue spectral bands, respectively.

The flash color factors, $I_r^f$, $I_g^f$, and $I_b^f$ in the red, green, and blue spectral bands, respectively, for the camera 800 may be determined as follows:

$$I_r^f = \sum_{i=1}^{L} s_i r_i^r \quad (4)$$

$$I_g^f = \sum_{i=1}^{L} s_i r_i^g \quad (5)$$

$$I_b^f = \sum_{i=1}^{L} s_i r_i^b \quad (6)$$

where the symbol $s_i$ represents L samples of the color spectrum of light provided by the flash 812; and the symbols $r_i^r$, $r_i^g$, and $r_i^b$ represent L samples of the red, green, and blue filter spectral responses, respectively. Values determined for the flash color factors, $I_r^f$, $I_g^f$, and $I_b^f$ (in accordance with equations (4), (5) and (6)), of the camera 800 may be stored in memory 809.

Alternatively, the adjustment of the white balance of the FOI' image may be performed at step 130, in accordance with any other suitable method. For example, the Bradford, VonKries or Sharp chromatic adaptation methods, known to those in the relevant art, may be used to adjust the white balance of the FOI' image. Following the adjustment of the white balance at step 130, the colors of objects in the corrected flash-only image FOI'' substantially represent pixel values that would have been measured had the scene been illuminated with a standard "D50" illuminant.

The method 100 continues at the next step 140, where the processor 806 analyses the reconstructed no-flash image NFI' and the flash-only image FOI' to determine pixel locations that are well-exposed in both the reconstructed no-flash image NFI' and the flash-only image FOI'. Based on this analysis, the processor 806 determines a plurality of local color transform values that may be used to chromatically adapt color component values at the determined pixel locations in the reconstructed no-flash image NFI' to match the corresponding color values in the corrected flash-only image FOI''. A method 300 of determining local color transform values to chromatically adapt color values in the reconstructed no-flash image NFI' to corresponding color values in the corrected flash-only image FOI'', as executed at step 140, will be described in detail below with reference to FIG. 3.

At the next step 150, the white balance of the reconstructed no-flash image NFI' is adjusted using the local color transform values determined at step 140 to generate a color corrected (or white balanced) no-flash image NFI''. A method 400 of adjusting the white balance of the reconstructed no-flash image NFI', as executed at step 150, will be described in detail below with reference to FIG. 4.

Figure 2:
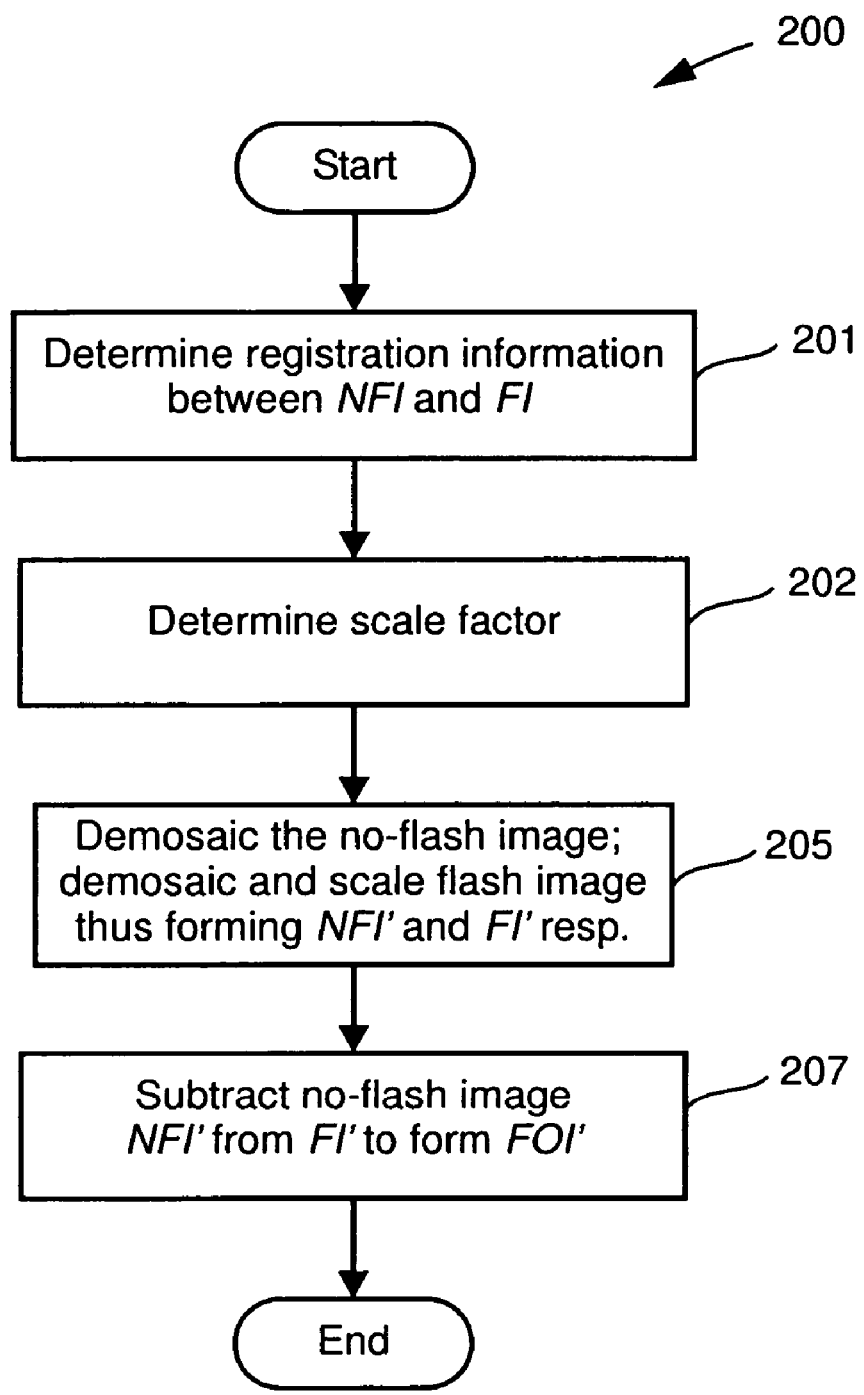
FIG. 2 is a flow diagram showing a method of removing ambient light components from an image captured using a flash illuminant, as executed during the method of FIG. 1.

The method 200 of removing the ambient light components from the flash image FI to generate a flash-only image FOI', as executed at step 120, will now be described in detail below with reference to FIG. 2. The method 200 may be implemented as software resident on the ROM 811 and being controlled in its execution by the processor 806.

The method 200 begins at step 201, where the processor 806 determines registration information between the no-flash image NFI and flash image FI. This registration information may be used to correct any changes in the position of scene points between the no-flash image NFI and the flash image FI due to movement of objects in the scene or camera movement in the time interval between capturing the no-flash image NFI and the flash image FI. The registration information takes the form of a warp map. Each location in the warp map contains a translation between corresponding scene points in the no-flash image NFI and the flash image FI. The warp map may be used to transform the flash image FI to the no-flash image NFI. The warp map may be queried for a transform value to be applied at every location in the input flash image FI such that the transform value determined from the warp map, maps a particular location in the flash image FI to a matching location in the no-flash image NFI. In certain photographic conditions, there may be no need to perform step 201. For example, the camera 800 may be used on a tripod and there may be very little subject motion (e.g., subjects pose for shots or the subject is inanimate) during the time interval between the capture of the no-flash image NFI and the flash image FI. In this instance, the processor 806 essentially determines an identity transform. A method 700 of determining registration information, as executed at step 201, will be described in detail below with reference to FIG. 7.

At the next step 202, a scale factor $s_f$ representing relative scaling of light measurements in the flash image FI and no-flash image NFI is determined based on settings of the camera 800 for respective exposures. The scale factor, $s_f$, may be applied to the flash image FI in order for the flash image FI to measure light on the same scale as the no-flash image NFI. The scale factor $s_f$ may be determined from exposure values of the flash image FI and no-flash image NFI according to Equation (7) below:

$$s_f = 2^{EV_f - EV_a} \quad (7)$$

where $EV_f$ is the exposure value of the flash image FI and $EV_a$ is the exposure value of the no-flash image NFI.

The aperture and shutter speed of the camera 800 may be recorded in accordance with the Additive Photographic Exposure System (APEX) standard and a film speed for the image sensor 805 may be determined in accordance with the ISO standard. In this instance, Equation (7) may be rewritten as follows:

$$s_f = 2^{[(A_f + T_f) - (A_a + T_a) + \log_2(G_f/G_a)]} \quad (8)$$

where $A_f$ and $T_f$ are the aperture and shutter settings, respectively, for the flash image FI; and $A_a$ and $T_a$ are the aperture and shutter settings, respectively, for the no-flash image NFI. $G_f$ and $G_a$ denote flash image FI and no-flash image NFI equivalent film speeds, respectively. The aperture, shutter speed or sensor equivalent film speed may be expressed in units other than those mentioned above. In this instance, Equation (8) may be modified accordingly.

The method 200 continues at the next step 205, where the processor 806 performs a demosaicing method on the no-flash image NFI to produce the reconstructed no-flash image NFI'. The demosaicing method is also performed on the flash image FI. The warp transform value determined at step 201 and the intensity scaling factor $s_f$ determined at step 202 are also applied to the flash image FI to produce a reconstructed scaled and registered flash image, denoted by the symbol FI'. Prior to step 205 each pixel of the no-flash image NFI and the flash image FI contains a sample of only one of the N possible spectral bands that the camera 800 may be sensitive to. The demosaicing method performed at step 205 estimates spectral bands missing at each pixel so that all N spectral bands are represented at each pixel. Any suitable demosaicing method known to those in the relevant art may be used at step 205. In one implementation, alternative sensor technologies that directly yield multiple color samples per pixel site, as known to those in the relevant art, may be used rather than demosaicing.

At the next step 207, the reconstructed no-flash image NFI', is then subtracted from the reconstructed scaled and registered flash image FI' to produce the flash-only image FOI'. The flash-only image FOI' is essentially the reconstructed flash image FI' with the contribution of any unknown ambient illuminant removed. Hence, the flash-only image FOI' approximates how the scene would appear when illuminated solely by light provided by the flash 812.

The processing-mask image MI may be determined according to any one of the following Equations (9), (10) and (11):

$$MI_n(x, y) = \begin{cases} 0 & \text{if } (\min(FOI'(x, y)) \leq s_f T_N) \text{ OR} \\ & (\min(NFI'(x, y)) \leq T_N) \\ 1 & \text{otherwise} \end{cases} \quad (9)$$

$$MI_s(x, y) = \begin{cases} 0 & \text{if } (\max(FOI'(x, y)) \geq s_f T_S) \text{ OR} \\ & (\max(NFI'(x, y)) \geq T_S) \\ 1 & \text{otherwise} \end{cases} \quad (10)$$

$$MI(x, y) = MI_n(x, y) \text{ AND } MI_s(x, y) \quad (11)$$

where $MI_n$ and $MI_s$ represent temporary variables denoting whether a pixel pair satisfy a condition on a lowest allowed exposure level and a highest allowed exposure level, respectively.

Equation (9) states that for each pixel in the mask image MI, the value of the pixel is set to false (zero) if a corresponding pixel in the flash-only image FOI' is less than a noise threshold $s_f T_N$ or a corresponding pixel in the reconstructed no-flash image NFI' is less than a noise threshold $T_N$. The inclusion of the scaling factor $s_f$ in Equation (9) takes into account the fact that following the scaling operation at step 205, the noise characteristics between the flash-only image FOI' and the reconstructed no-flash image NFI', will in general be different.

The noise threshold may be determined as follows:

$$T_N = 0.15M \quad (12)$$

where M represents the maximum pixel intensity of pixel image data output by the image sensor 805 of the camera 800. For example, if the camera 800 outputs data between 0 and 65535, then M=65535 and $T_N$=9830.25. However, any suitable value of $T_N$ may be selected to indicate noisy pixels and the value of $T_N$ will in general depend on the camera 800 implementing the described methods.

Equation (10) states that for each pixel in the mask image MI the value of the pixel is set to 0 if a corresponding pixel in the flash-only image FOI' is greater than a saturation threshold $s_f T_s$ or the corresponding pixel in the reconstructed no-flash image NFI' is greater than the saturation threshold $T_S$. The inclusion of the scaling factor $s_f$ in Equation (10) takes into account the fact that following the scaling operation at step 205, the level at which pixels become saturated in the flash-only image FOI' and the reconstructed no-flash NFI' image will in general be different. The saturation threshold may be determined as follows:

$$T_S = 0.9M \quad (13)$$

where M represents the maximum pixel intensity of pixel image data output by the image sensor 805 of the camera 800. For example, if the camera 800 outputs data between 0 and 65535, then M=65535 and $T_S$=58981.5. However, any suitable value of $T_S$ may be selected to indicate saturated pixels and the optimum value of $T_S$ will in general depend on the camera 800 implementing the described methods. Following step 125 of the method 100, the mask image MI will contain zeros for any pixel that has been determined to be saturated or noisy and all other pixels in the MI will be marked by 1.0.

The function min( ) described above returns a smallest component value from each of the red, green and blue component values of a pixel. Similarly the function max( ) described above returns a largest component value from each of the red, green and blue component values of a pixel. Alternative methods for determining the processing mask MI may be used. For example, the min( ) and max( ) functions of Equations (9) and (10) may be replaced by other pixel measures such as luminance or norm.

Figure 3:
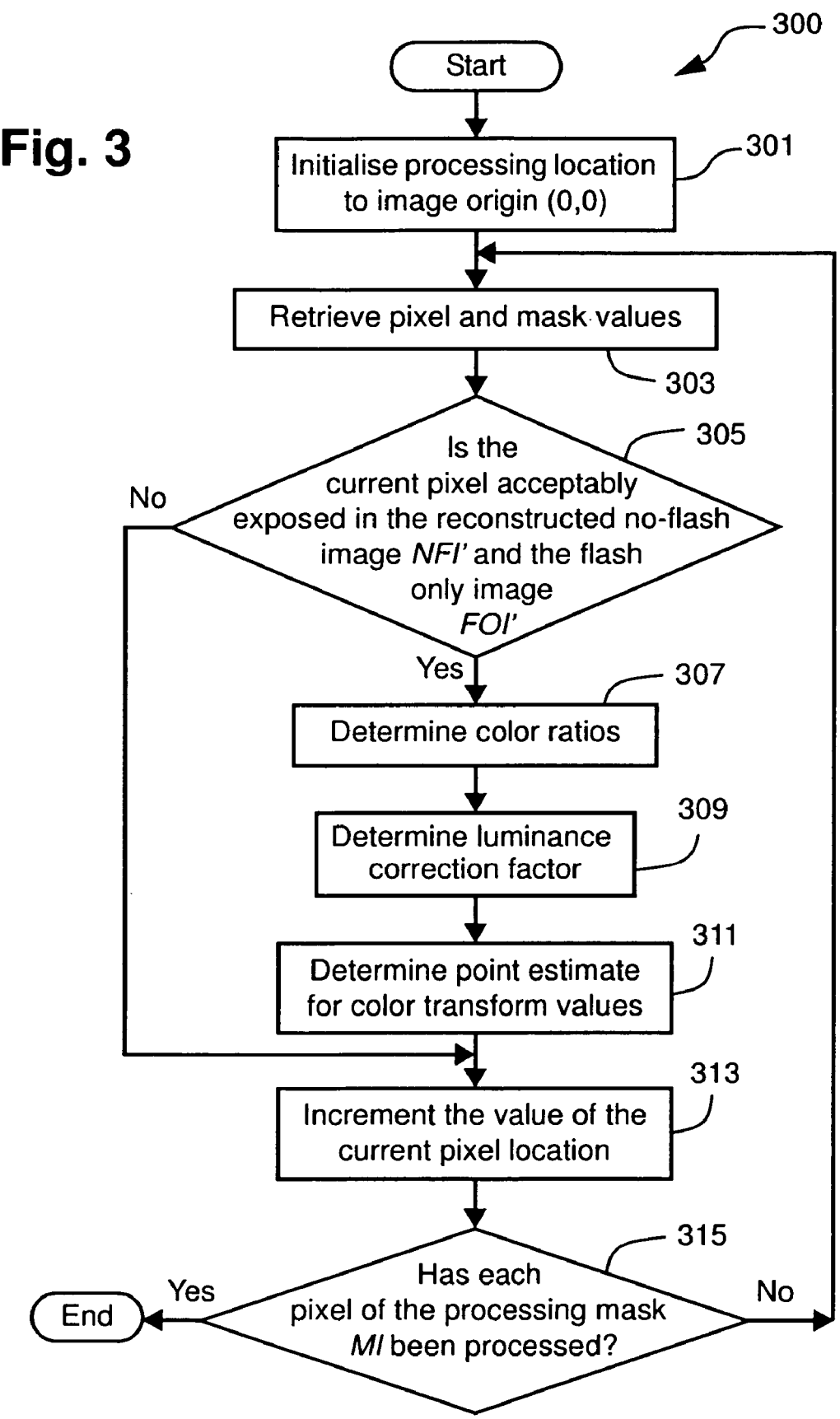
FIG. 3 is a flow diagram showing a method of determining local color transform values, as executed during the method of FIG. 1.

The method 300 of determining local color transform values to chromatically adapt color values in the reconstructed no-flash image NFI' to corresponding color values in the corrected flash-only image FOI", will now be described in detail with reference to FIG. 3. The method 300 may be implemented as software resident in the ROM 811 and being controlled in its execution by the processor 806. In the method 300, pixel locations that are well-exposed in both the reconstructed no-flash image NFI' and the flash-only image FOI', as indicated by the processing mask image MI, are processed and estimates of local color transform values are generated at these points.

The steps of the method 300 are applied to pairs of pixels from corresponding locations in the reconstructed no-flash image NFI' and the corrected flash-only image FOI". The method 300 begins at step 301 where a pixel location (x, y) is initialized by the processor 806 to an image origin (0, 0). At the next step 303 the processor 806 retrieves pixel values from NFI'(x,y), FOI'(x, y) and MI(x, y). Then at the next step 305, if the processor 806 determines that the value of MI(x, y) is a non-zero value, indicating that the pixel at the current pixel location is acceptably exposed in both the reconstructed no-flash image NFI' and the flash-only image FOI' then the method 300 proceeds to step 307. Otherwise, the method 300 proceeds to step 313. A local estimate of the color transform values are subsequently determined in the following steps 307, 309, and 311. At step 307, the following color ratios C(x, y) are determined:

$$C_r(x, y) = \frac{NFI'(x, y)_r}{FOI''(x, y)_r} \quad (14)$$

$$C_g(x, y) = \frac{NFI'(x, y)_g}{FOI''(x, y)_g} \quad (15)$$

$$C_b(x, y) = \frac{NFI'(x, y)_b}{FOI''(x, y)_b} \quad (16)$$

where the subscripts r, g, and b represent the red, green and blue color components of the pixel respectively.

The reconstructed no-flash image NFI' and the corrected flash-only image FOI" represent the same scene illuminated by different light sources. These light sources may differ in color, intensity, distance and angle relative to the captured scene. Hence the pixels in the reconstructed no-flash image NFI' and the corrected flash-only image FOI" corresponding to the same scene point may be expected to vary from each other in terms of color and luminance. The differences in luminance must be compensated for in the next step 309 where a luminance correction factor is determined by the processor 806. The luminance correction factor may be determined as follows:

$$k(x, y) = \frac{0.3FOI''(x, y)_r + 0.59FOI''(x, y)_g + 0.11FOI''(x, y)_b}{0.3NFI'(x, y)_r + 0.59NFI'(x, y)_g + 0.11NFI'(x, y)_b} \quad (17)$$

where k(x, y) represents the luminance correction factor for pixel (x, y). The coefficients of 0.3, 0.59 and 0.11 in Equation (17) are selected for determining the luminance of a pixel based on the red, green, and blue color components of the pixel assuming sRGB chromaticities. Alternatively, for any given camera sensitive to N spectral bands, a suitable set of N coefficients may be determined based on the spectral sensitivities of the particular camera.

An alternative luminance correction factor may be determined by choosing k(x, y) to normalize the effective luminance of the color ratios determined at step 307, as follows:

$$k(x, y) = \frac{1}{0.3C_r(x, y) + 0.59C_g(x, y) + 0.11C_b(x, y)} \quad (18)$$

At the next step 311, the processor 806 determines a point estimate of the color transform values for the external illuminant as follows:

$$I(x, y)_r{}^a = I_r^{D50} k(x, y) C_r(x, y) \quad (19)$$

$$I(x, y)_g{}^a = I_g^{D50} k(x, y) C_g(x, y) \quad (20)$$

$$I(x, y)_b{}^a = I_b^{D50} k(x, y) C_b(x, y) \quad (21)$$

where $I(x, y)_r{}^a$, $I(x, y)_g{}^a$, and $I(x, y)_b{}^a$ represent the point estimates of the red, green, and blue components of the local color transform value for the white point of the reconstructed no-flash image NFI' for pixel (x, y), respectively. The symbols $I_r^{D50}$, $I_g^{D50}$, and $I_b^{D50}$ represent the red, green, and blue components of the local color transform value for white point of the corrected flash-only image FOI", respectively.

If the processor 806 determines that the value of MI(x, y) is a zero value, at step 305, indicating that the current pixel location is unacceptably exposed in either the reconstructed no-flash image NFI' or the flash-only image FOI' then the method 300 proceeds to step 313. At step 313, the processor 806 increments the value of the current pixel location (x, y) in a raster scan order. Then at the next step 315, if the processor 806 determines that each pixel of the processing mask image MI has been processed then the method 300 concludes. Otherwise, the method 300 returns to step 303.

Figure 4:
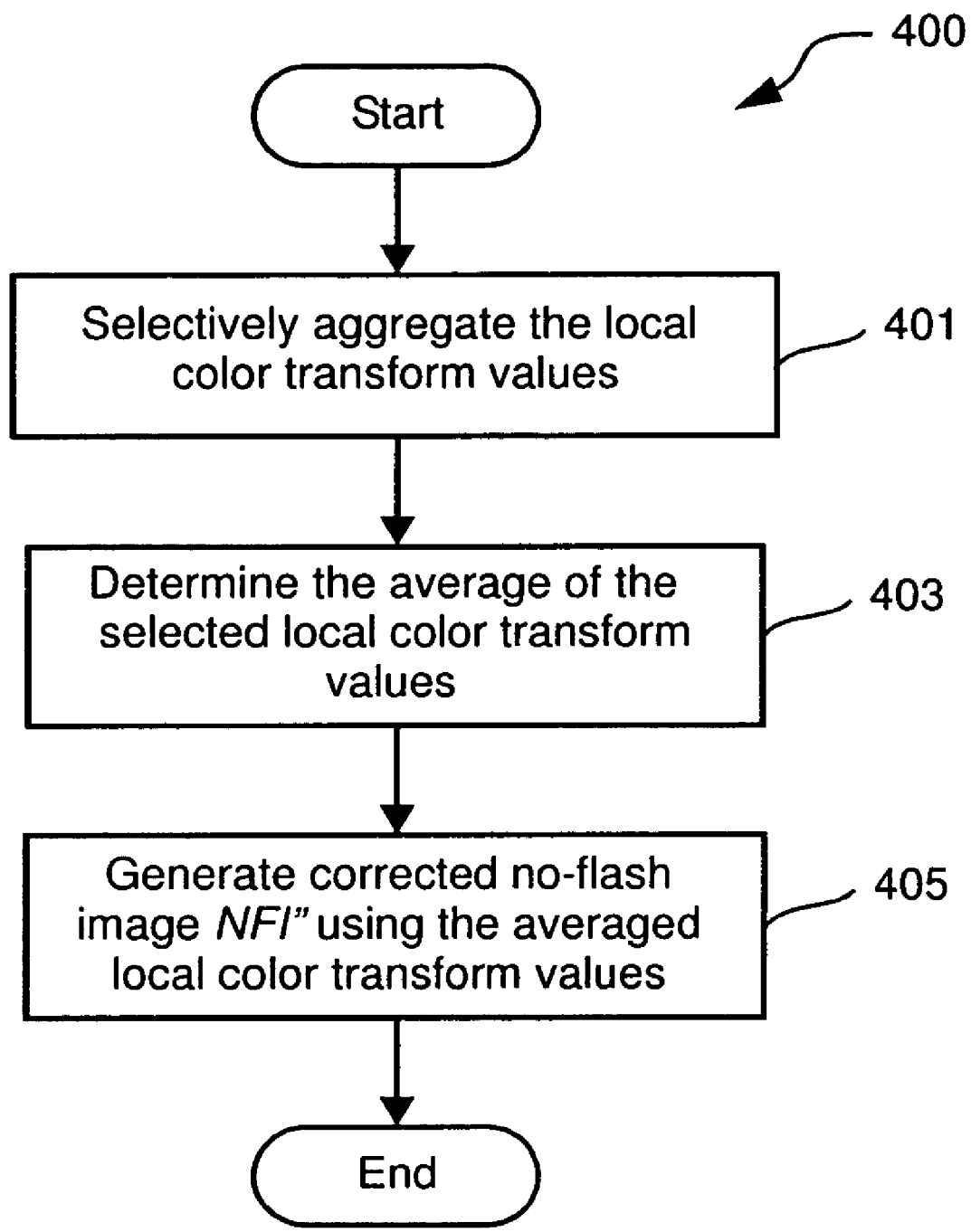
FIG. 4 is a flow diagram showing a method of adjusting the white balance of an image captured at ambient light, as executed during the method of FIG. 1.

The method 400 of adjusting the white balance of the reconstructed no-flash image NFI', as executed at step 150, to produce a corrected (or white balanced) no-flash image NFI", will now be described in detail below with reference to FIG. 4. The method 400 may be implemented as software resident in the ROM 811 and being controlled in its execution by the processor 806. The method 400 utilises the local color transform values determined at step 140 to adjust the white balance of the reconstructed no-flash image NFI'. In the method 400 an overall estimate of the white point of the reconstructed no-flash image NFI' is determined by averaging the local color transform values in each spectral band at each point where MI(x, y) is equal to 1.0. However, such a procedure can be affected by noise. In particular there may exist regions in the reconstructed no-flash image NFI' or the corrected flash-only image FOI" where the estimates of the local color transform values of the scene white point are noisy and unreliable. For this reason, step 401 of the method 400 selectively aggregates the local color transform values. A method 500 of selectively aggregating the local color transform values, as executed at step 401, will be described in detail below with reference to FIG. 5. An alternative method 600 of selectively aggregating the local color transform values, will also be described in detail below with reference to FIG. 6.

At the next step 403 of the method 400, the selected local color transform values are averaged by the processor 806. At the next step 405, the averaged local color transform values, ($\bar{I}_r{}^a, \bar{I}_g{}^a, \bar{I}_b{}^a$), are applied globally to the reconstructed no-flash image NFI' to produce the corrected no-flash image NFI". The color values for a single pixel (x, y) of the corrected no-flash image NFI" are determined at step 405 using the "RGB scaling" method of chromatic adaptation as follows:

$$NFI''(x, y)_r = NFI'(x, y)_r I_r^{D50}/\bar{I}_r^a \quad (22)$$

$$NFI''(x, y)_g = NFI'(x, y)_g I_g^{D50}/\bar{I}_g^a \quad (23)$$

$$NFI''(x, y)_b = NFI'(x, y)_b I_b^{D50}/\bar{I}_b^a \quad (24)$$

where $NFI'(x,y)_r$, $NFI'(x,y)_g$ and $NFI'(x,y)_b$ represent the red, green, and blue color component values of the pixel at position (x, y) to be modified in NFI', respectively. The symbols $NFI''(x,y)_r$, $NFI''(x, y)_g$ and $NFI''(x, y)_b$ represent the red, green, and blue color component values, respectively, of the pixel at position (x, y) in the corrected (or white balanced) no-flash image NFI". The symbols $\bar{I}_r^a$, $\bar{I}_g^a$, and $\bar{I}_b^a$ represent the color response of the camera 800 to the external illuminant, as determined in step 403. The symbols $I_r^{D50}$, $I_g^{D50}$, and $I_b^{D50}$ represent the color response of the camera 800 to the standard "D50" illuminant (normalized to a luminance of unity) in the red, green, and blue spectral bands, respectively.

Figure 5:
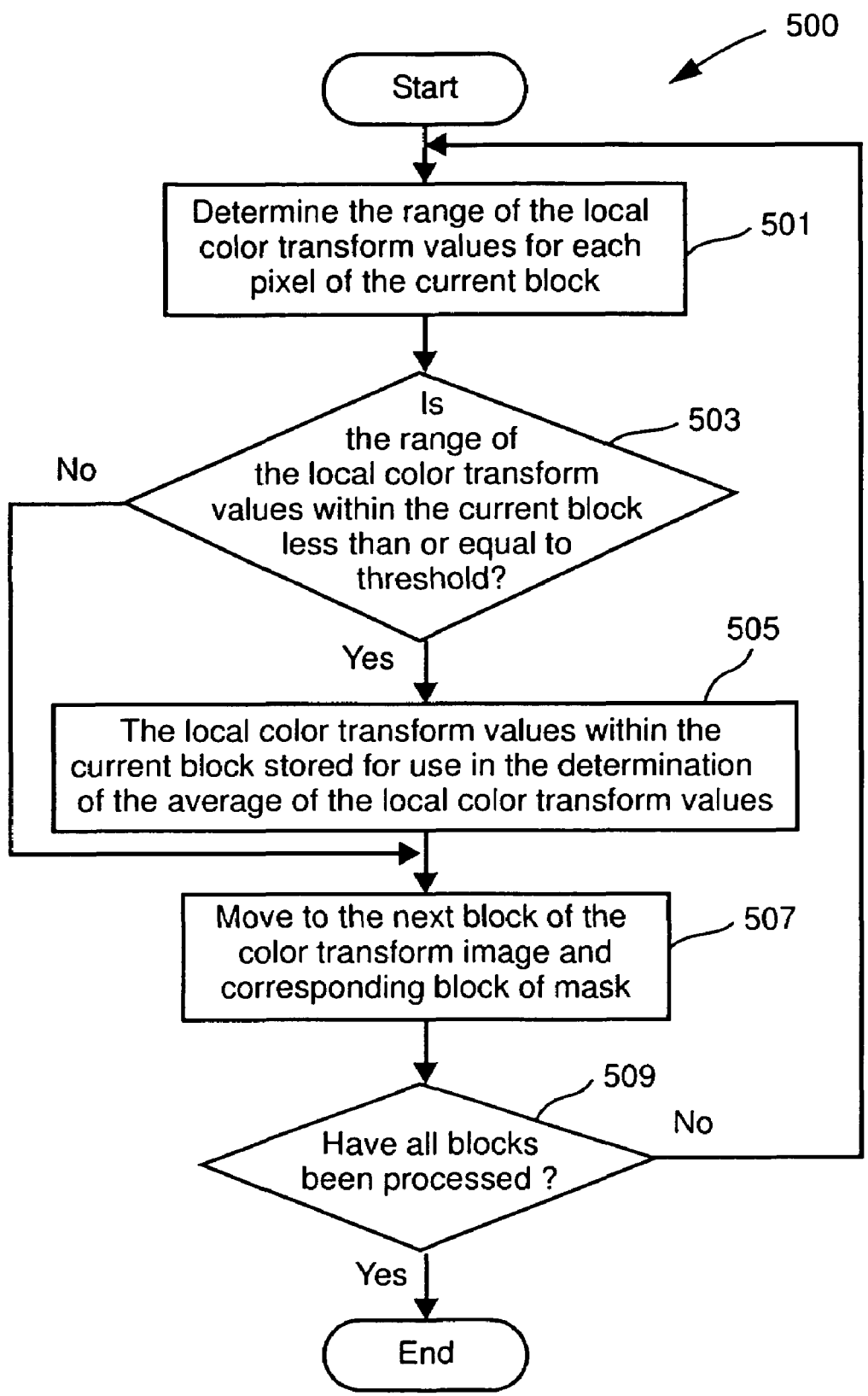
FIG. 5 is a flow diagram showing a method of selectively aggregating local color transform values, as executed during the method of FIG. 4.

The method 500 of selectively aggregating the local color transform values, as executed at step 401, will be described in detail below with reference to FIG. 5. The method 500 may be implemented as software resident in the ROM 811 and being controlled in its execution by the processor 806. In the method 500, an image W, containing local color transform value estimates, and the processing mask MI are divided into non-overlapping blocks of 32×32 pixel values.

The method 500 begins at step 501, where the processor 806 determines the range of the local color transform values for each pixel of a current block of the color transform image W, separately. Step 501 is performed for pixels in the color transform image W having a corresponding nonzero entry in the processing mask image MI. At the next step 503, if the processor 806 determines that the range of local color transform values within the current block of the color transform image W exceed a predetermined threshold, then the method 500 proceeds to step 507. Otherwise, the method proceeds to step 505. The predetermined threshold of step 503 may be set to 0.7P, where P is the maximum value permitted by the operating precision of the camera 800 (i.e., 65535 in the case of 16 bit arithmetic or 1.0 if floating point arithmetic can be used). Different threshold values may be required for different types of cameras, and different threshold values may be required for each color component.

At step 505, the local color transform values within the current block that correspond to a non zero entry in the processing mask MI are stored in memory 811, for example, for use in the determination of the average of the local color transform values as at step 403.

At the next step 507, the processor 806 moves to the next block of the color transform image W and the corresponding block of the processing mask image MI. At the next step 509, if the processor 806 determines that the current block in the color transform image W is the last, then the method 500 concludes. Otherwise, the method 500 returns to step 501.

Figure 6:
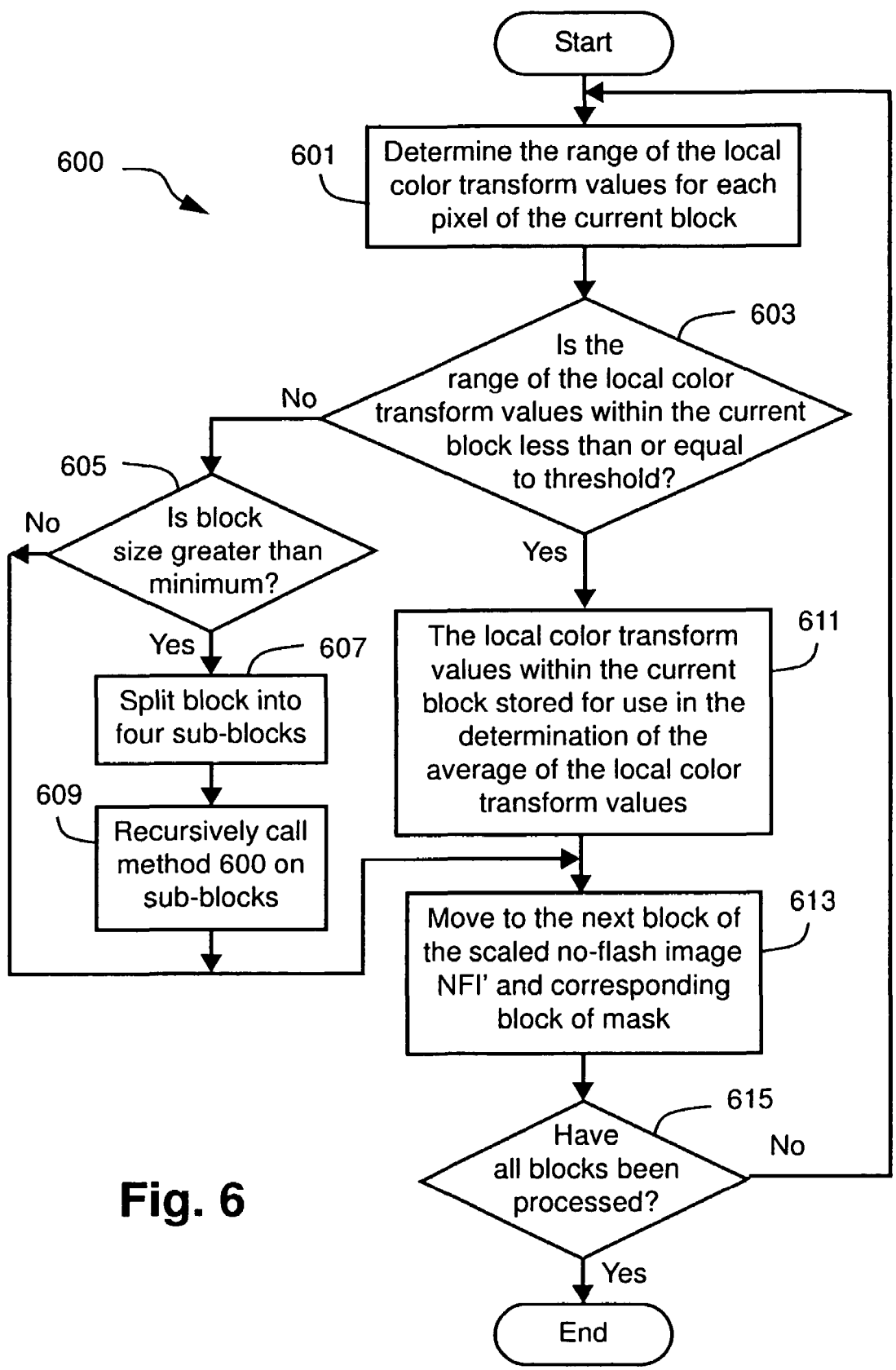
FIG. 6 is a flow diagram showing a further method of selectively aggregating the local color transform values.

The method 600 of selectively aggregating the local color transform values will now be described in detail below with reference to FIG. 6. The method 600 may be implemented as software resident on the ROM 811 and being controlled in its execution by the processor 806. In the method 600 the color transform image W, containing local color transform value estimates, and the processing mask MI are also divided into non-overlapping blocks. However, in the method 600 the initial block size used is the entire image.

The method 600 begins at step 601, where the processor 806 determines the range of the local color transform values for each component of a current block of the color transform image W. Again, step 601 is performed for samples in the color transform image W having a corresponding nonzero entry in the processing mask image MI. At the next step 603, if the processor 806 determines that the range of each color component value within the current block of the color transform image W does not exceed a predetermined threshold, then the method 600 proceeds to step 611. Otherwise, the method 600 proceeds to step 605. Again, the predetermined threshold of step 603 may be set to 0.7P, where P is the maximum value permitted by the operating precision of the camera 800 (i.e., 65535 in the case of 16 bit arithmetic or 1.0 if floating point arithmetic can be used). At step 611, the estimate of the local color transform values within the current block that correspond to a non-zero entry in the processing mask MI are input to the global average calculation of step 403.

At step 605, if the processor 806 determines that a predetermined minimum block size has been reached then the method 600 proceeds to step 613. Otherwise, the method 600 proceeds to step 607. In one implementation, the processor 806 determines whether the largest of the block dimensions is greater than or equal to sixty-four (64) samples at step 605.

At step 607, the current block is split into four (4) sub-blocks. Then at the next step 609, the method 600 recursively calls the method 600 to process each of the new sub-blocks determined at step 607.

At step 613, the processor 806 moves to the next block of the color transform image W and the corresponding block of the processing mask image MI. Then at step 615, if the processor 806 determines that the current block in the color transform image W is the last, then the method 600 concludes. Otherwise, the method 600 returns to step 601.

Figure 12:
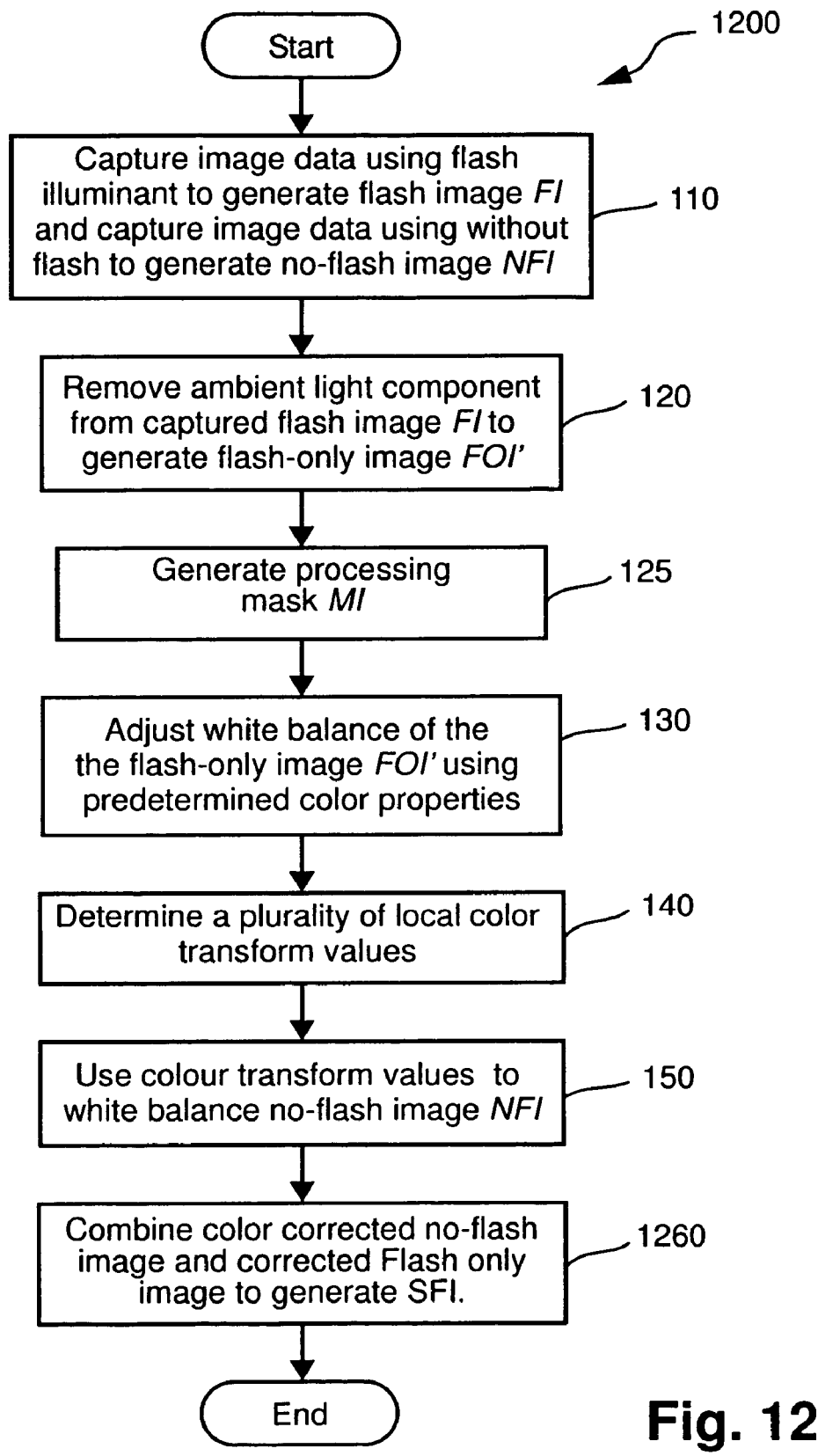
FIG. 12 is a flow diagram showing a method of generating a digital image of a scene, according to another embodiment of the invention.
Figure 13:
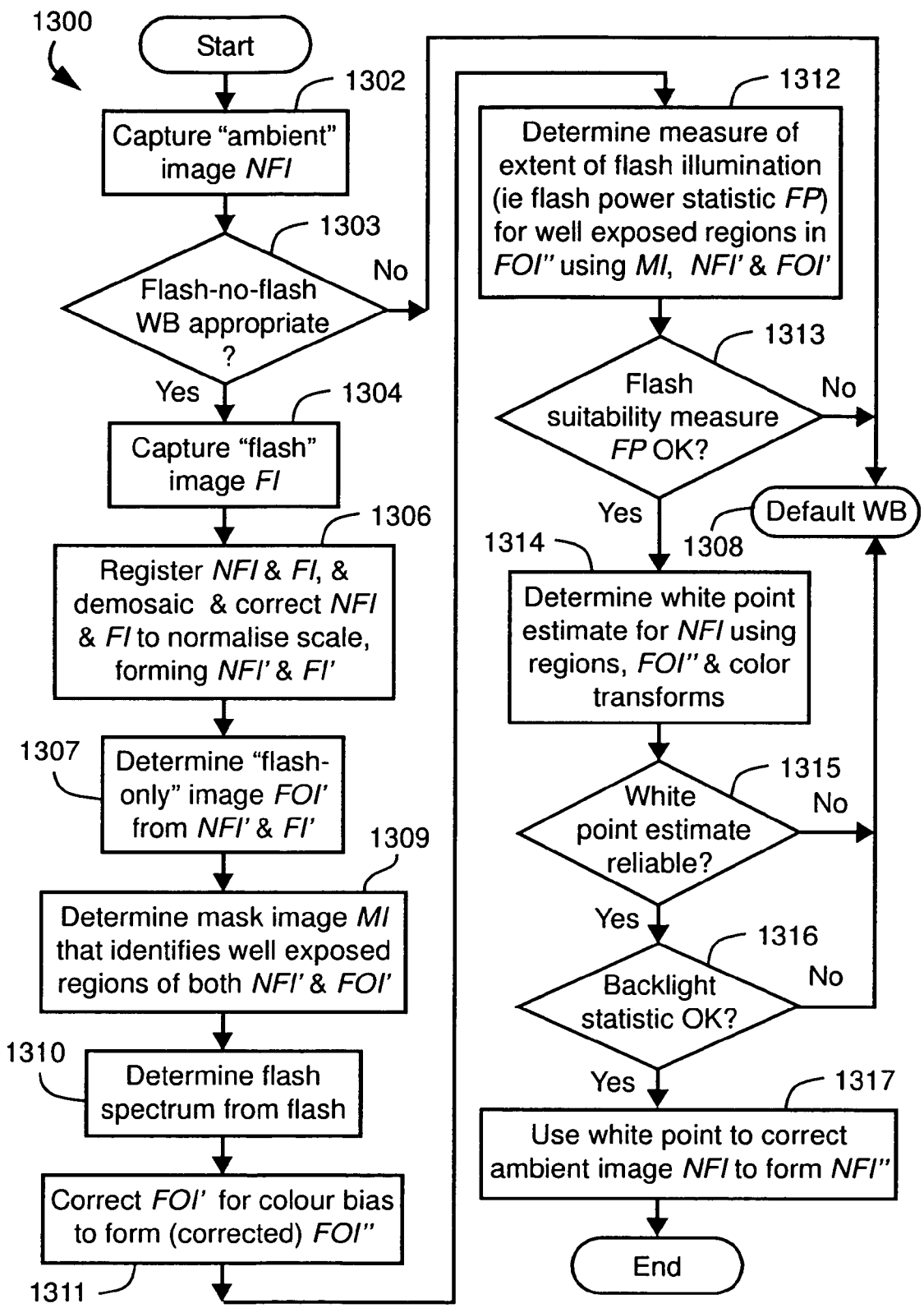
FIG. 13 is an overview process flow diagram showing a method of generating a digital image, according to still another embodiment of the invention.

A method 1200 of generating a digital image of a scene, according to another embodiment of the invention, will now be described with reference to FIG. 12. Again, the method 1200 may be implemented as software resident in the ROM 811 of the camera 800 and being executed by the processor 806. As seen in FIG. 12, steps 110 to 150 of the method 1200 are the same as those described above for the method 100. However, the method 1200 continues at the next step 1260, where the corrected flash-only image FOI" and the corrected no-flash image NFI" are combined to generate a synthetic flash image SFI. The combination of the corrected flash-only image FOI" and the corrected no-flash image NFI" may be performed under user control. In this instance, the user controls at least the apparent strength of the flash in the synthetic flash image along a linear scale. A second linear control may also be provided that permits an adjustment of the overall color temperature for the synthetic flash image, SFI. The apparent strength of the flash components and the overall color temperature settings may be automatically determined. A method 1000 of combining the corrected flash-only image FOI" and the corrected no-flash image NFI" as executed at step 1260 will be described in detail below with reference to FIG. 10. The method 1000 may implemented as software resident in the ROM 811 and being controlled in its execution by the processor 806.

The method 1000 begins at step 1010, where the processor 806 determines scaling factors $S_{FOI'}$ and $S_{NFI'}$ for each of the corrected flash-only image FOI" and the corrected no-flash image NFI" respectively. The scaling factors $S_{FOI'}$ and $S_{NFI'}$ may be determined using Equations (25) and (26), respectively, as follows:

$$S_{FOI''} = \frac{I_{max}}{I_{FOI''}^{95} s_f} \quad (25)$$

$$S_{NFI''} = \frac{I_{max}}{I_{NFI''}^{95}} \quad (26)$$

where $s_f$ is determined using Equation (7), $I_{FOI''}^{95}$ represents a maximum intensity for the lower 95% of pixel intensities in the corrected flash-only image FOI", $I_{NFI''}^{95}$ represents a maximum intensity for the lower 95% of pixel intensities in the corrected no-flash image NFI", and $I_{max}$ represents a predetermined maximum intensity for the synthetic flash image, SFI. The scaling factors $S_{FOI''}$ and $S_{NFI''}$ are used for setting the range of captured pixel intensities represented in the synthetic flash image SFI. At the next step 1020 of the method 1000, the processor 806 initialises loop variables in preparation for a raster order scan over the corrected flash-only image FOI" and the corrected no-flash image NFI" and a top left pixel from both the flash only image FOI" and the no-flash image NFI" is retrieved from memory 809.

The method 1000 continues at the next step 1030, where the processor 806 analyses the pixels at the current pixel location (x, y) to determine whether blending is to be performed at the current pixel location (x, y). The processor 806 analyses the pixels at step 1030 in accordance with Equation (27) as follows:

$$T(x,y)_{1140} = \begin{cases} \text{true} & \text{if } I_{FOI''}(x,y)S_{FOI''} > I_{NFI''}(x,y)S_{NFI''} \\ \text{false} & \text{otherwise} \end{cases} \quad (27)$$

where $I_{FOI''}(x, y)$ represents perceptual luminance of the pixel at location (x, y) of the corrected flash-only image FOI", $I_{NFI''}(x, y)$ represents perceptual luminance of the pixel at location (x, y) of the corrected no-flash image NFI", and $S_{FOI''}$ and $S_{NFI''}$ are the scaling factors defined above by Equations (25-26). If the processor 806 determines that blending is to be performed at the current pixel location (i.e., Equation (27) returns true), at step 1030, then a blend amount A(x, y) is determined for the current pixel location at the next step 1040. The blend amount A(x, y) is determined at step 1040 according to the following Equation (28):

$$A(x,y) = \alpha_g(\alpha_m I_{FOI''}(x,y)S_{FOI''} + (1-\alpha_m)I_{NFI''}(x,y)S_{NFI''}) \quad (28)$$

where $\alpha_g$ represents a predetermined global flash strength setting in the range [0 . . . 1] and $\alpha_m$ represents a global mix parameter in the range of [0 . . . 1]. The values of $\alpha_g$ and $\alpha_m$ indicate the degree to which the relative luminances of the flash and no-flash images effects the blending. The global mix $\alpha_m$ may be set to a preset value of 0.5. However, the global mix $\alpha_m$ may be user adjustable. The perceptual pixel luminances $I_{FOI''}(x, y)$ and $I_{NFI''}(x, y)$ are determined as the luminance in the CIE L*a*b* color space. The perceptual pixel luminances $I_{FOI''}(x, y)$ and $I_{NFI''}(x, y)$ may be determined as a gamma corrected weighted average of the linear color samples in the corrected flash-only image FOI" and the corrected no-flash image NFI' respectively. Other approximations to the perceptual pixel luminances $I_{FOI}(x, y)$ and $I_{NFI}(x, y)$ may be used, including a gamma corrected intensity of the green (G) component.

The method 1000 continues at the next step 1050, where the value of an output pixel O(x, y) in the synthetic flash image SFI is determined according to Equation (29) as follows:

$$O(x,y) = A(x,y)FOI''(x,y)S_{FOI''} + (1-A(x,y))NFI''(x,y)S_{NFI''} \quad (29)$$

If the processor 806 determines at step 1030 that blending is not to be performed at the current pixel location (i.e., Equation (27) returns false), then the method 1000 proceeds to the next step 1045. At step 1045, the output pixel O(x, y) of the synthetic flash image SFI is determined according to Equation (30) as follows:

$$O(x,y) = NFI''(x,y)S_{NFI''} \quad (30)$$

At the next step 1055 of the method 1000, the color of the output pixel O'(x, y) of the synthetic flash image SFI, as determined at either of steps 1050 or 1045, may be biased. Red, green and blue color component values, $O'_r(x, y)$, $O'_g(x, y)$, $O'_b(x, y)$, respectively, of the output pixel O(x, y) of the synthetic flash image SFI may be biased at step 1055, according to Equations (31-33) as follows:

$$O'_r(x,y) = \frac{O_r(x,y)I_r^{User}}{I_r^{D50}} \quad (31)$$

$$O'_g(x,y) = \frac{O_g(x,y)I_g^{User}}{I_g^{D50}} \quad (32)$$

$$O'_b(x,y) = \frac{O_b(x,y)I_b^{User}}{I_b^{D50}} \quad (33)$$

where $I_r^{User}$, $I_g^{User}$, and $I_b^{User}$ represent the response of the camera 800 to the user specified illuminant and $I_r^{D50}$, $I_g^{D50}$, and $I_b^{D50}$ represent the response of the camera 800 to the standard illuminant (D50).

The output pixel O(x, y) of the synthetic flash image SFI may be biased at step 1055 using a slider control with which a range of illuminant responses $I^{User}$ may be selected to allow both a warmer (i.e., greater emphasis in red) and cooler (i.e., greater emphasis in blue). Such a slider control may be implemented in software and be displayed on the display 807, for example. The slider control may be adjusted using the user interface 808. For example, a one dimensional (1D) slider control may be provided for the selection of the illuminant response $I^{User}$ with the central position of the slider control corresponding to the default D50 illuminant, a fully left position corresponding to a predetermined "warm" illuminant $I^{Warm}$ and a fully right position corresponding to a predetermined "cool" illuminant $I^{Cool}$. When the slider control is in the central position, Equations (31-33) above become an identity transform. When the slider control is in a position other than the central position the central position, the illuminant response $I^{User}$ is determined using linear interpolation between the predetermined "warm" illuminant $I^{Warm}$ and the default D50 illuminant $I^{D50}$ or between the default D50 illuminant $I^{D50}$ and the predetermined cool illuminant $I^{Cool}$ based on the slider control position. Other chromatic adaptation transforms may also be used at step 1055. For example, the Bradford, VonKries or Sharp methods are widely known in the art.

At the next step 1060, the pixel position for each of the corrected flash-only image FOI" and the corrected no-flash image NFI" images is incremented to a next pixel location in a raster scan order. Then at step 1070, if the processor 806 determines that all pixels in the corrected flash-only image FOI" and the corrected no-flash image NFI" have been processed, the method 1000 concludes. Otherwise, the method 1000 returns to step 1030.

Although the method 1000 utilises a user specified global flash strength setting $\alpha_g$, such a value may be determined automatically. For example a number of image quality measures based on histograms are well known in the image processing art. Such image quality measures may be used to evaluate the result of blending with a range of global flash strength setting $\alpha_g$ values with the image quality measures producing the best result being selected. Alternatively, a predetermined fixed value for the global flash strength setting $\alpha_g$ may be used.

In one implementation, step 1200 of the method 1200 may be implemented as an estimation problem. In such an implementation, estimates of noise variance $\sigma_{FOI''}^2$ and $\sigma_{NFI''}^2$ of each of the pixels of the corrected flash-only image FOI" and the corrected no-flash image NFI" respectively are determined. The method for estimating the noise variances $\sigma_{FOI''}^2$ and $\sigma_{NFI''}^2$ is particular to a specific image sensor. However, the noise variance $\sigma_{FOI''}^2$ and $\sigma_{NFI''}^2$ may be estimated as a function of ISO sensitivity and exposure time for an image being captured together with captured light intensity. Based on Gaussian assumptions a Maximum Likelihood (ML) estimate of the output pixel O(x, y) at location (x, y) in the synthetic flash image may be determined in accordance with Equation (34) as follows:

$$O(x, y) = \frac{(\sigma_{FOI}^2 NFI''(x, y) S_{NFI''} + \sigma_{NFI}^2 FOI''(x, y) S_{FOI''})}{\sigma_{FOI''}^2 + \sigma_{NFI''}^2} \quad (34)$$

Similar to the method 1000, described above, an overall color bias may be introduced to the output pixel O(x, y) determined in accordance with Equations (30-32) based on a user specified color appearance.

In another implementation, step 1260 of the method 1200 may be implemented as an addition of flash information from the corrected flash-only image FOI" into the corrected no-flash image NFI". In this case the output pixel value O(x, y) at location (x, y) in the synthetic flash image may be determined in accordance with Equation (35) as follows:

$$O(x, y) = \frac{NFI''(x, y) S_{NFI''} + \alpha_g FOI''(x, y) S_{FOI''}}{1 + \alpha_g} \quad (35)$$

Similar to the method 1000, described above, an overall color bias may be introduced to the output pixel O(x, y) determined in accordance with Equation (30) based on a user specified color appearance.

The method 700 of determining registration information between the no-flash image NFI and flash image FI, as executed at step 201, will now be described in detail below with reference to FIG. 7. In the method 700, the global rotation and scaling of the no-flash image NFI is measured and compensated for. The method 700 may be implemented as software resident in the ROM 811 and being controlled in its execution by the processor 806.

The method 700 begins at step 701, where the no-flash image NFI and the flash image FI, as read from the image sensor 805, are down sampled. The no-flash image NFI and the flash image FI are down sampled by extracting one green sample from each block of four pixel locations, corresponding to the two-dimensional (2D) array of photosensitive elements of the sensor 805, and then down sampling the green samples. In step 701, a weighted linear sum of pixel values in the neighborhood of a particular pixel is used to generate a single down sampled pixel. Such down sampling methods are known to those in the relevant art.

At the next step 702, the down sampled no-flash image and flash image are Fourier-Mellin transformed to generate transform coefficients. At the next step 703, the generated transform coefficients are cross-correlated to generate a two dimensional (2D) array indexed by rotation and scale. Note that in this context the word scale is used in the sense of size or resolution as opposed to numerical multiplication. For clarity, scale will subsequently be referred to as "size". The values of the array typically exhibit a dominant peak at a particular location, the indices of which indicate the rotation and size at which the flash image FI matches the no-flash image NFI most closely. The position of this peak and corresponding rotation and size parameters are determined at the next step 705. Then at the next step 707 the rotation and size parameters determined at step 705 are applied to the down sampled flash image generated at step 701 to generate rotation and size aligned flash and no-flash image images.

The method 700 continues at the next step 709 where the rotation and size aligned flash image and no-flash images are cross correlated using a Fourier correlation. A main correlation peak resulting from step 709 indicates the two dimensional (2D) translation at which the flash image FI and no-flash image NFI input at step 701 are best matched. At the next step 711, the correlation peak and a corresponding translation amount are determined by the processor 806.

Then at the next step 713, the processor 806 analyses the aligned flash image and no-flash images to find "interesting" points. A Harris corner detector may be used to find interesting points. However, many corner (or "feature") detectors are known in the image processing art, any of which may be used in step 713. For each point identified in step 713, a sub-image of a fixed width and height (e.g., 256 pixels×256 pixels), centered at that point, is generated at full resolution from the original no-flash image NFI and flash image FI. When generating the sub-image from the flash image FI the previously determined global rotation, size and translation parameters are applied such that the two sub-images are coarsely aligned. The processor 806 performs a Fourier phase-correlation on the sub-images to determine how the sub-images are related to one another by translation. The position of a peak in the phase correlation of the sub-images corresponds to a translation required to map the two sub-images to each other. If there is no distinct peak in the phase correlation the point at which the sub-images are centered is ignored. Accordingly, a plurality of points and transformation vectors may be generated at the identified points.

The method 700 concludes at the next step 715, where the plurality of points and transformation vectors generated in step 713 are converted into a Delaunay triangulation where each triangle vertex corresponds to an interesting point with a transform at that point. Using such triangulation an arbitrary point may be selected, the triangle that contains the point may be determined, and from the corners of the triangle three nearby interesting points whose transforms in the alignment are known may be identified. These transforms may be interpolated to generate a transform for the selected arbitrary point. Hence the sparse transform information generated for the interesting points may be converted into a fine alignment warp for all points in the image.

If the camera 800 is mounted on a tripod and a subject being photographed is stationary then step 201 of the method 200 may be omitted. In other photographic situations, a global registration of the image pair (i.e., a first image of the scene using only the ambient illuminant of the scene and a second image of the scene using the illuminant provided by the flash 812) may be performed.

Figure 9:
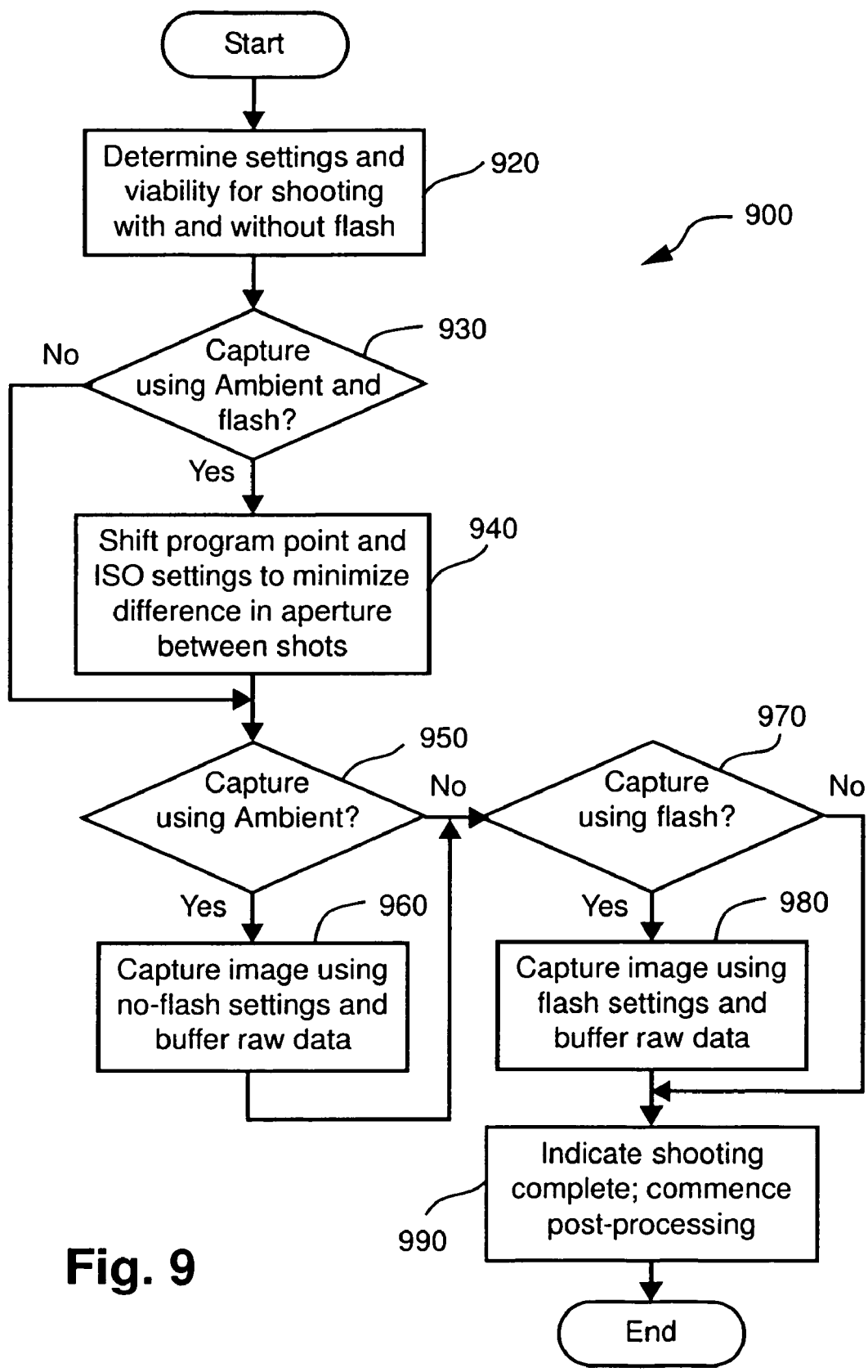
FIG. 9 is a flow diagram showing a method of capturing an image, as executed during the method of FIG. 1.
Figure 10:
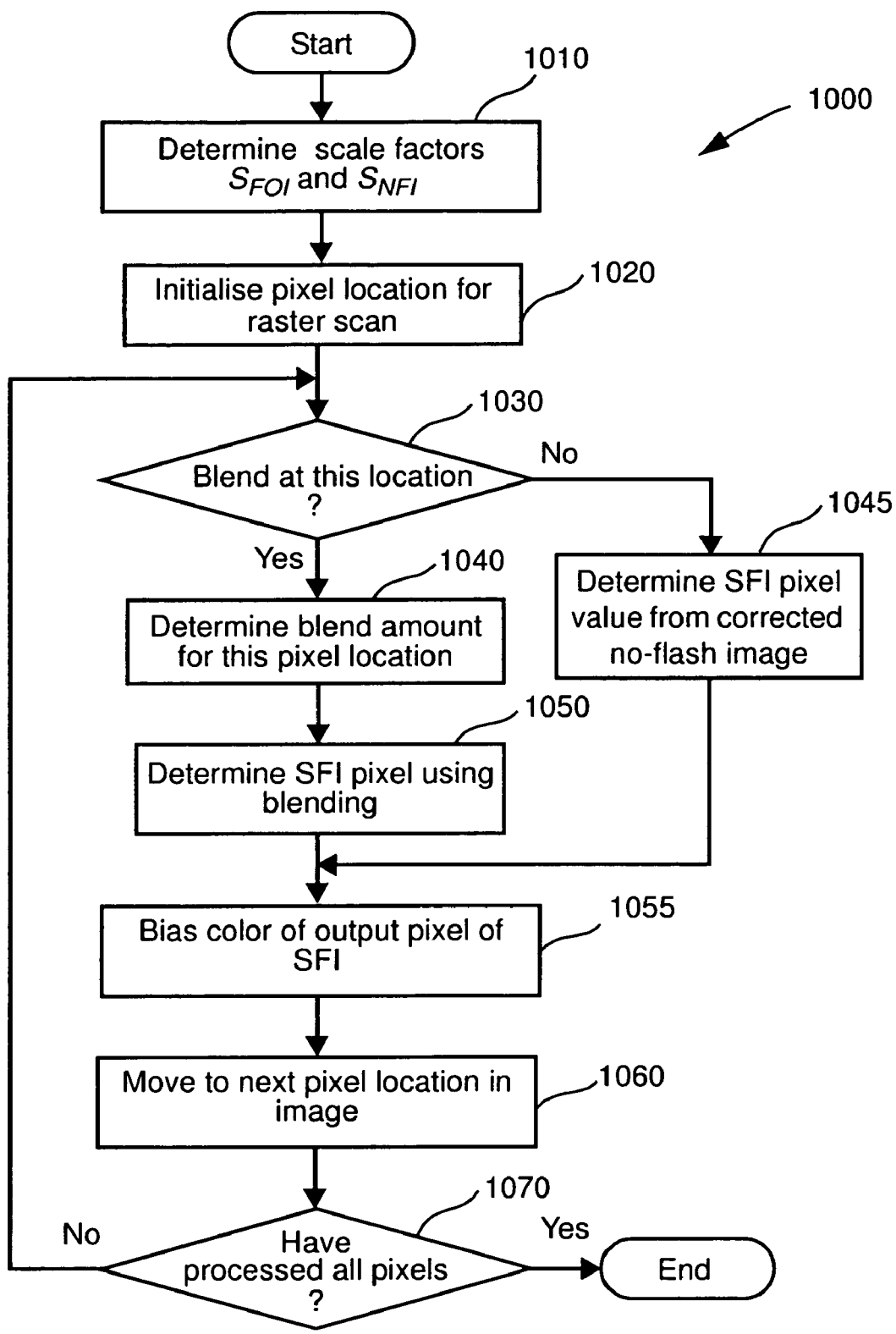
FIG. 10 is a flow diagram showing a method of combining pixels from a corrected no-flash image and a corrected flash-only image, as executed during the method of FIG. 1.

The method 900 of capturing an image, as executed at step 110, will now be described in detail below with reference to FIG. 9. The method 900 may be implemented as software resident on the ROM 811 and being controlled in its execution by the processor 806.

The method 900 begins at step 920, where in response to the detection of a half press of the shutter release button of the user interface 808, the processor 806 focuses and meters the scene to be captured and determines various photographic settings (e.g., shutter speed and aperture, use of flash etc). For example, the user may hold the camera 800 in position such that the camera 800 points towards a subject in the desired scene. The user may then compose the image of the scene using the ViewFinder 804 and half press the shutter release button using the user interface 808. For the camera 800 the viability of capturing the image of the scene with and without flash 812 (i.e., a no-flash image NFI and a FI, respectively) is also determined at step 920. If an adequate exposure of an image of the scene can be achieved without the use of the flash 812 and using a shutter speed which is suitable for the photographic conditions then a flag configured within memory 809 and denoted "capture-using-no-flash" is set to true and exposure settings of ISO, shutter speed and aperture are determined for the scene. Further, if the distance of the subject of the scene from the camera 800 and the ambient light of the scene is such that the flash 812 could be beneficial for image capture then a flag "capture-using-flash" is set to true and exposure settings (e.g., ISO, shutter speed and aperture) are determined for the image to be captured of the scene. The method 900 continues at the next step 930, where if the processor 806 determines that the "capture-using-no-flash" and the "capture-using-flash" flags are both set to true, indicating that both the flash image FI and no-flash image NFI may be captured, then the method 900 proceeds to step 940. Otherwise, the method 900 proceeds directly to step 950. At step 940, the processor 806 adjusts the settings determined at step 920 for capturing the flash image FI and the no-flash image NFI (i.e., the image pair). A program point for the image pair to be captured is adjusted, at step 940, so that the apertures used for capturing each of the images in the image pair vary by the smallest amount practical. This smallest amount is not a pre-determined fixed amount. Rather, the difference between the smallest amount the apertures used for capturing each of the images in the image pair is the smallest amount possible while still achieving usable settings for the aperture, shutter speed and ISO sensitivity parameters. In one implementation, in order to keep the differences between the apertures used for capturing each of the flash image FI and the no-flash image NFI to a smallest amount practical, the aperture to be used for capturing the flash image is reduced, the ISO setting to be used for capturing the no-flash image NFI is increased and the shutter speed to be used for capturing the flash image FI is also increased. In such an implementation, the remaining photographic settings determined at step 920 (i.e., other than the ISO setting and shutter speed, respectively) are adjusted to maintain a predetermined desired exposure level. The amount by which the exposure settings can be adjusted at step 940 will typically be a function of the optics and the characteristics of the sensor 805 for the camera 800.

The method 900 continues at the next step 950, where if the processor 806 determines that the value of the "capture-using-no-flash" flag is set to true the method 900 proceeds to step 960. Otherwise, the method 900 proceeds directly to step 970. At step 960 an image of the scene is captured at ambient light (i.e., the no-flash image NFI) using the settings determined at step 920 and/or at step 940 for capturing the no-flash image NFI. The image pixel data captured by the sensor 805 at step 960 is read from the sensor 805 and stored in memory 809. At step 970, if the processor 806 determines that the value of the "capture-using-flash" flag is set to true, then the method 900 proceeds to step 980. Otherwise, the method 900 proceeds directly to step 990. At step 980, an image of the scene is captured using the settings determined at step 920 and/or at step 940 for capturing an image of the scene using the flash 812 (i.e., for capturing the flash image FI). The pixel image data captured at step 980 by the sensor 805 is read from the sensor 805 and is stored in memory 809.

At the next step 990, the processor 806 of the camera 800 indicates to the user that the image capture phase has been completed. This indication may be implemented by the processor 806 generating a shutter release sound or lighting an indicator visible to the user. The processor 806 then proceeds to process the pixel image data stored in memory 806 at steps 960 and 980. If only one image has been captured at step 960 or 980 then processing may comprise the steps of demosaicing, white balancing, sharpening and compression of the known art prior to the processed images being written out to the mass storage 813 of the camera 800. When images are captured at both steps 960 and 980 then processing may include steps 120 to 150 of the method 100 or steps 120 to 1260 of the method 1200 prior to the processed image being written out to the mass storage 813 of the camera 800. In a variation of this step, the flash image FI and no-flash image NFI may be independently processed and written out to the mass storage 813 of the camera 800 in addition to the generated synthetic fill flash image SFI. In one implementation, when both the "capture-using-no-flash" and "capture-using-flash" flags are true at step 930, then the pixel image data representing the image pair may be written out to the mass storage 813 of the camera 800 for subsequent processing using general purpose computing hardware (e.g., a personal computer (PC)), for example.

A method 1300 of generating a digital image, according to a still another embodiment of the present invention, will now be described with reference to FIGS. 13 to 17B. The method 1300 (a) establishes, using one or more criteria, which one of the flash-no-flash white balancing method, and the single image automatic white balancing method, can be expected to produce a better result; and (b) applies, based upon this determination, the appropriate white balancing method. The method 1300 may be referred as a "conditional white balancing method" of generating a digital image.

The method 1300 may be implemented as software resident in the ROM 811 of the camera 800 and being executed by the processor 806. The method 1300 begins at step 1302 where the processor 806 captures an image using only the available ambient light. The image captured at step 1302 is referred to as a no-flash image NFI, as above. At the next step 1303 if the processor 806 determines that the prevailing photographic conditions are not suitable for use of the flash-no-flash white balance method, then the method 1300 proceeds to a step 1308. Otherwise, the method 1300 proceeds to step 1304. At step 1308, the processor 806 applies either a conventional white balance method such as the single image automatic white balancing method, or alternatively, no white balancing processing at all. The method 1300 then concludes.

At step 1304, the processor 806 captures another image of the scene in question, this time using the flash illuminant 812 of the camera 800. This image is referred to as the flash image FI, as above.

Then at the next step 1306, the processor 806 registers the images NFI and FI, and demosaics the images, correcting NFI and the FI for shutter speed, aperture, and equivalent film speed setting so that stored pixel values representing the scene measure light intensity using the same scale. This forms a reconstructed no-flash image NFI' and a registered flash image FI'.

At the next step 1307, the processor 806 determines a flash-only image FOI' by subtracting pixels in the reconstructed no-flash image NFI' from corresponding registered pixels in the registered flash image FI'. The step 1306 and 1307 are described in more detail above with reference to FIGS. 2 and 7.

Thereafter, at step 1309, the processor 806 determines a processing mask image MI, which identifies regions of both the reconstructed no-flash image NFI' and the flash-only image FOI' that are neither over-exposed, nor under-exposed, i.e. those regions that are referred to as being "well exposed".

At a following step 1310, the processor 806 determines spectral characteristics of the flash illuminant 812 used to capture the flash image FI. Then at the next step 1311, the processor 806 corrects the flash only image FOI' for color bias, thereby forming the corrected flash-only image FOI". It is noted that the data required for determination of the spectral characteristics of the flash in the step 1310 may be captured in the step 1304 from the light emitted by the flash 812. Alternately, the spectral characteristics of the flash 812 are known beforehand and stored in memory 809, or are communicated from the flash 812 to the camera 800 in the case of an external flash unit. At a following step 1312, the processor 806 determines a flash suitability measure (referred to as the flash power statistic FP), indicating the extent of flash illumination of the well-exposed regions in the corrected flash-only image FOI", using the processing mask MI, the reconstructed no-flash image NFI', and the flash-only image FOI'. At the next step 1313, if the processor 806 determines that the flash suitability measure FP does not meet certain pre-defined suitability criteria, then the method 1300 proceeds to the step 1308. Otherwise, the method 1300 proceeds to step 1314. The steps 1312 and 1313 are described in more detail in regard to FIGS. 15A and 15B.

Figure 14A:
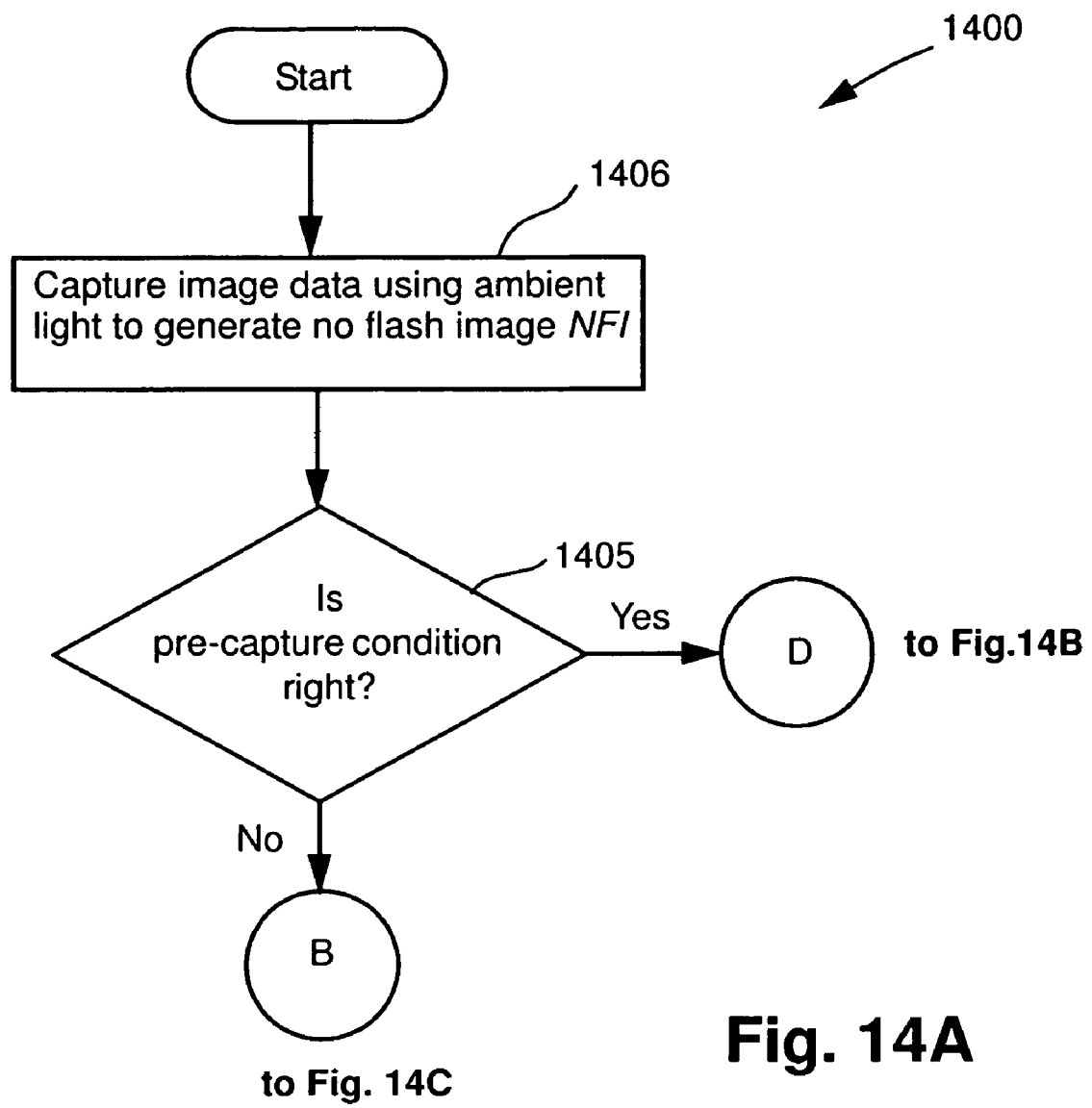
FIGS. 14A-14C are flow diagram fragments showing a method of adjusting the white balance of a captured image according to the method of FIG. 13.
Figure 14B:
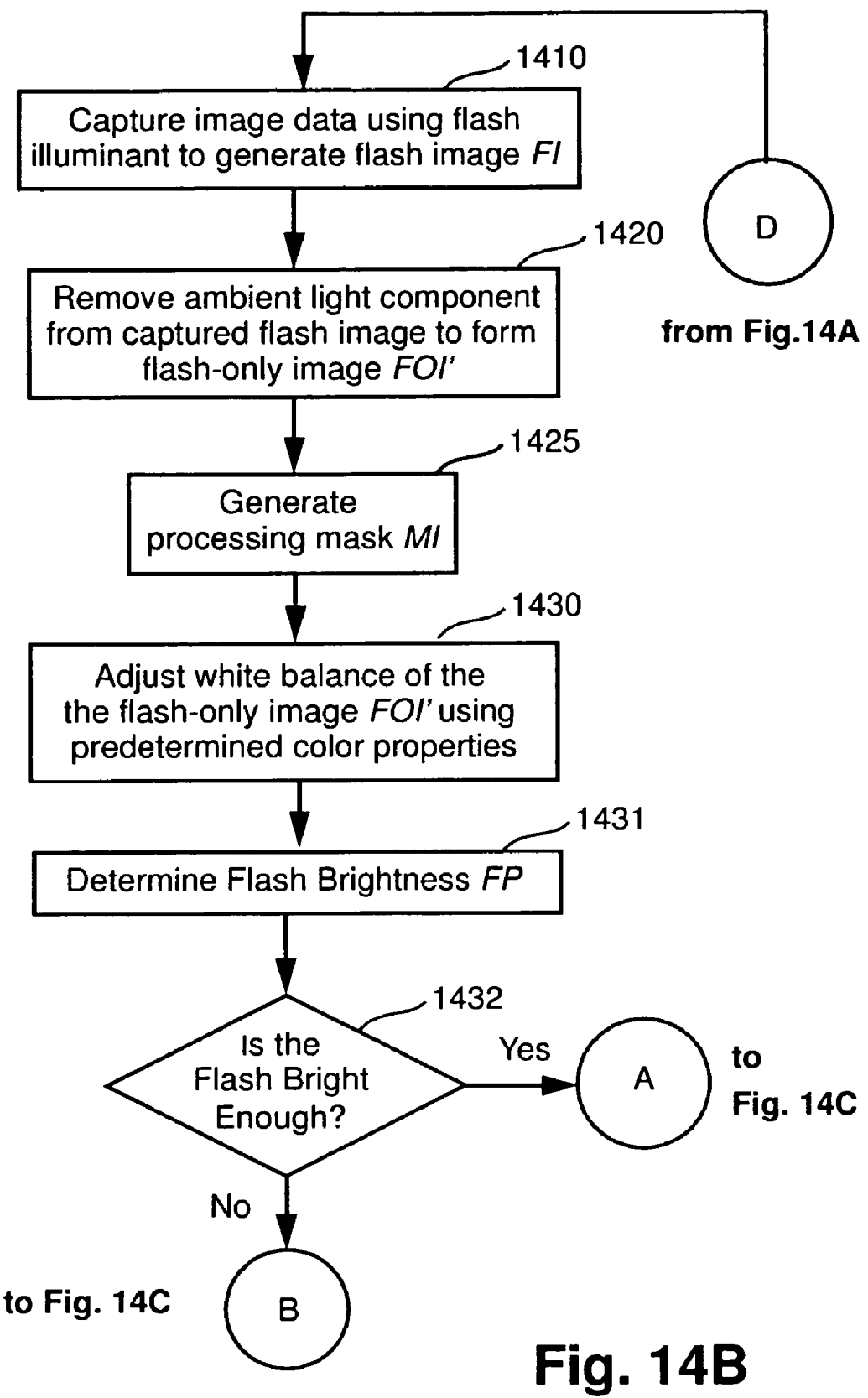
Figure 14C:
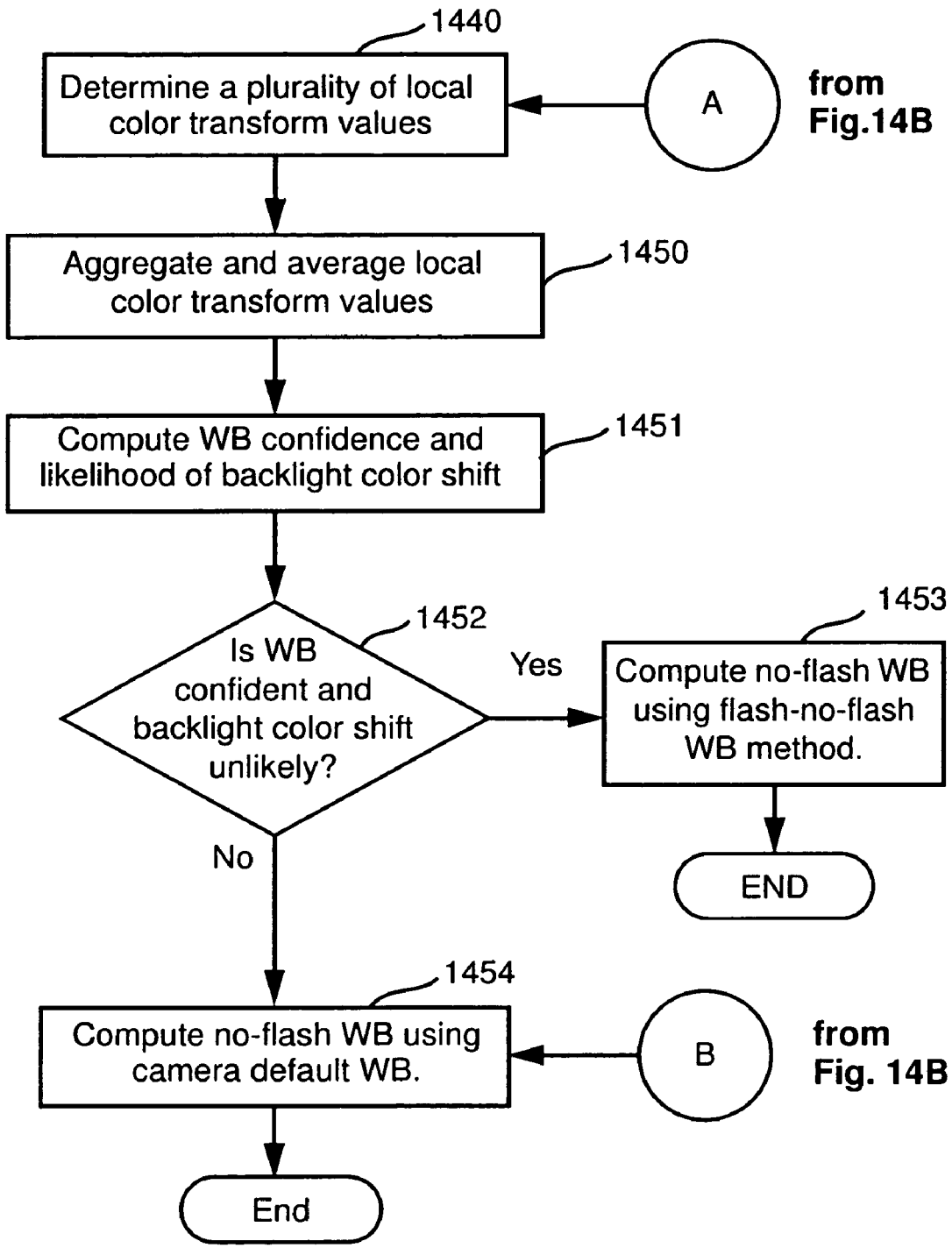

At step 1314, the processor 806 determines a white point estimate for the no-flash image NFI using a knowledge of the identified well-exposed regions from the processing mask MI, the corrected flash-only image FOI", and color transforms determined in a step 1440 in FIG. 14C. The step 1314 is described in more detail in regard to FIGS. 3, 4 and 5.

Then at the next step 1315, if the processor 806 determines that the aforementioned white-point estimate is not reliable, then the method 1300 proceeds to step 1308. Otherwise, the method 1300 proceeds to step 1316. At step 1316, the processor 806 determines if a backlight statistic for the reconstructed no-flash image NFI' is acceptable. Step 1316 is described in more detail in regard to FIGS. 16, 17A and 17B.

If the processor 806 determines that a backlight statistic for the reconstructed no-flash image NFI' is not acceptable at step 1316, then the method 1300 proceeds to the step 1308. Otherwise, the method 1300 proceeds to step 1317. At step 1317, the processor 806 uses the calculated white point to correct the no-flash image NFI to form the desired digital image of the scene, this being referred to as the corrected no-flash image NFI". The method 1300 then concludes.

FIGS. 14A-14C show a method 1400 for implementing the disclosed conditional white balancing method 1300. The method 1400 may be implemented as software resident in the ROM 811, the software being executed by the processor 806 of the camera 800.

The method 1400 begins at step 1406, where the processor 806 captures image data using ambient light, the captured image being the no-flash image NFI. At the next step 1405, if the processor 806 determines that the current photographic situation is suitable for the flash-no-flash white balance method, then the method 1400 proceeds to a connectivity symbol "D" that directs the method 1400 to a corresponding symbol in FIG. 14B. If, however, at the testing step 1405 the processor 806 determines that the current photographic situation is not suitable, then the method 1400 proceeds to a connectivity symbol "B" that directs the method 1400 to a corresponding symbol in FIG. 14C. The connectivity symbol "B" in FIG. 14C is directed to a step 1454, where the processor 806 applies a conventional white balance method such as the single image automatic white balancing method, after which the method 1400 of FIG. 14C concludes.

At step 1410, the processor 806 captures the second flash image FI of the scene that has been captured in the form of the no-flash image NFI in the step 1406 in FIG. 14A. The step 1410 uses the flash 812 to illuminate the scene while the step 1406 is implemented without using the flash 812, using only the ambient illumination of the scene. The duration of the interval between the capture of the two images NFI and FI is made as short as possible to reduce the complexity of subsequent registration (e.g. 1306 in FIG. 13).

In a following step 1420, the images NFI and FI are registered, in accordance with the method 200, to match each point in the flash image FI to a corresponding point in the no-flash image NFI. The two images FI and NFI are then demosaiced, scaled and corrected (see 1306 in FIG. 13) for shutter speed, aperture, and equivalent film speed setting so that stored pixel values representing the scene measure light intensity using the same scale, to form the respective images NFI' and FI'. Pixel values of image NFI' are then subtracted from respective pixel values of the flash image FI', to create the flash-only image FOI'. The flash-only image FOI' represents an estimate of the image of the scene that would have been captured if the scene had only been illuminated with the flash 812 without the incorporation of any external ambient lighting.

At the next step 1425, the processor 806 determines the processing mask MI indicating regions in both NFI' and FI' which are neither underexposed (noisy) nor overexposed (saturated). Such regions are also referred to as being well exposed.

Then at the next step 1430, the processor 806 determines, from spectral samples transmitted by the flash 812 to the camera 800, the effect of the spectrum of light provided by the flash 812 on the images NFI' and FI'. The step 1430 uses this information to correct the flash-only image FOI' to show the scene without any color bias, thereby forming the corrected flash-only image FOI".

Thereafter at step 1431, the processor 806 determines the flash power statistic FP taking into account the well-exposed regions identified by the processing mask MI, and the image pair NFI' and FI'.

At a following step 1432, the processor 806 determines, using the flash power statistic FP, a measure of flash suitability as a function of the flash intensity (relative to the ambient illumination) and computed flash coverage. At step 1432, the processor 806 determines whether the flash-no-flash method will fail due to poor flash illumination of the scene. If the flash strength and coverage is determined to be suitable, then the method 1400 proceeds to a connectivity symbol "A" that refers to a corresponding symbol in FIG. 14C. Otherwise, the method 1400 proceeds to the connectivity symbol "B" that refers to the corresponding symbol in FIG. 14C, where the method 1400 proceeds to apply a more conventional method of white balance and concludes.

The step 1405 is, from a practical perspective, performed while the user directs the camera 800 towards a desired scene. The user then composes a shot using the view finder 804 and half presses the shutter release button using the user interface 808. In response to the detection of the shutter release button being half pressed, the processor 806 performs various operations and sets various camera control parameters. Such operations typically include detecting conditions external to the camera 800 at the scene for exposure metering, and auto focusing the lens 802 to make sure the photographic scene or a subject of the scene is in focus. Based on the detected external conditions, the processor 806 determines a set of control parameter values for capturing a photograph of the scene.

Upon detecting that the shutter release button has been fully depressed, the processor 806 captures pixel image data representing the no-flash image NFI of the scene based on the intensity of light falling on each of the photosensitive elements of the image sensor 805. The pixel image data representing the no-flash image NFI is preferably buffered in the memory 809 during subsequent processing but may be stored on the storage medium 813.

In the step 1405 the camera 800 performs preliminary testing to determine whether the flash-no-flash white balance method would produce a satisfactory result. Since capturing the flash image FI uses battery power the flash image FI should only be captured if it provides useful information. Therefore, the testing step 1405 considers information that is on hand prior to the step 1410 (see FIG. 14B) in order to determine whether the flash image FI would provide additional useful additional information and thus should be captured. For example, the step 1405 may test the intensity of light falling on each of the photosensitive elements of the image sensor 805. The step 1405 may also determine the range to the focus point of the scene as determined by the camera 800 using the lens focus system or some additional range detection apparatus, such as an infrared range finder. If the intensity of the light falling on image sensor 805 or measured by an exposure metering sensor exceeds a threshold $T^{LL}$ or the range to the focus point is greater than a threshold $T^{FD}$, then the step 1405 determines that the flash will not have a significant effect on the intended subject of the captured images, and the flash-no-flash white balance method will not produce an acceptable result. In this case, the step 1405 branches to the step 1454. Otherwise the step 1405 branches to the step 1410.

The step 1405 can be implemented in a number of ways. In one embodiment, $T^{LL}$ may be set to four (4) times the level of flash light reflected from a grey matte object at a distance equal to the distance between the camera 800 and the focus point when flash unit 812 fires. This approach takes into account the effects of the ISO rating of the camera 800 as well as aperture and shutter settings on the light striking image sensor 805.

The level of light reflected from an object at an unknown distance as a result of light emitted by a flash unit can be determined by a photosensitive diode or similar light sensor. In one embodiment, the threshold $T^{FD}$ is set to greater than 10 meters. The optimal values of $T^{LL}$ and $T^{FD}$ will in general depend on the properties of the camera 800, the image sensor 805, and the flash 812. The step 1405 can also incorporate information from the white balance sensor 810.

At the step 1410, the camera 800 captures further pixel image data representing the flash image FI. The flash FI is captured using the flash 812. The flash image FI can be captured as a result of user input using the user interface 808. Alternatively, the flash image FI can be captured under automatic control. Considering automatic capture of the flash image FI, the camera 800 can measure the intensity and color of the ambient light using the WB sensor 810, and if it is determined that the intensity and color of the ambient light have values outside a range of predetermined threshold values, the camera 800 can decide to capture the flash image FI.

As noted, the time interval between the capture of the no-flash image NFI and the flash image FI in the method 1300 is preferably minimized (e.g., less than 0.2 seconds). This reduces the difficulty in registering the flash image FI and the no-flash image NFI. One method of minimizing the interval between successive capture of the flash image FI and the no-flash image NFI is to firstly capture and store both images in memory 809, and to defer image processing such as demosaicing until after both FI and NFI are captured. In this instance, the memory 809 or a portion thereof may be configured as fast buffer memory. In one embodiment, multiple readout circuits may be used to increase the speed of readout of the captured pixel image data from the sensor 805.

In the step 1420, the processor 806 removes the ambient light component from the captured flash image FI to generate the flash-only image FOI'. The flash-only image FOI' represents the scene as the scene would have been captured if the flash 812 was the only source of illumination. The flash-only image FOI' takes the form of an image containing red (R), green (G) and blue (B) data for each pixel location in a linear light color space of the camera 800. The method 200 of removing the ambient light components from the flash image FI' to generate the flash-only image FOI', as described above with reference to FIG. 2, may be executed at step 1420.

In the step 1425 the processor 806 generates the binary processing mask MI. This processing mask MI contains non-zero values in pixel locations in which both the reconstructed no-flash image NFI' and the flash-only image FOI' are well exposed. The processing mask MI is used in the following step 1430 to ensure that only pixels in locations with a predetermined threshold level of exposure are used to determine the white point of the no-flash image NFI.

In step 1430, the white balance of the flash-only image FOI' is adjusted using predetermined color properties of the light provided by the flash 812, in the color space of the camera 800, to determine a corrected flash-only image FOI''. In general, color properties for a camera that is sensitive to N spectral bands (N being a positive integer) may be represented by N color factors. In the step 1430, N color factors representing the response of N color filters of the camera 800 to the light provided by the flash 812 are used to adjust the white balance of the flash-only image FOI'.

In one embodiment, the adjustment of the white balance of the flash-only image FOI' in the step 1430 to form the corrected flash-only FOI'' may be performed by dividing the intensity of each pixel of the flash-only image FOI' in each color plane by a corresponding ratio. The ratio represents the ratio of a color factor determined for the flash 812 to a color factor of some predetermined standard illuminant. In one example, the camera 800 is sensitive to three spectral bands denoted as red (R), green (G), and blue (B), and "D50" is selected as the standard illuminant. In this instance, the color component values for a single pixel at a location (x, y) of the corrected flash only image FOI'' can be determined in accordance with Equations (1) to (6) as described above Following the adjustment of the white balance of the image FOI' at the step 1430, the colors of objects in the corrected flash-only image FOI'' substantially represent pixel values that would have been measured had the scene been illuminated only with the standard "D50" illuminant.

In the step 1431 the processor 806 analyses the reconstructed no-flash image NFI', the mask image MI, and the flash-only image FOI' to determine the intensity of the flash illuminating the flash-only image FOI' compared to the reconstructed no-flash image NFI'. The term "reconstructed" relates to the demosaicing operation that is performed in the step 1420, which is described in more detail in regard to step 205 in the method 200 of FIG. 2. The step 1431 operates in regard to the well exposed regions of the images NFI' and FOI' as indicated in the mask image MI. At step 1431 the processor 806 produces the flash power statistic FP. A method 1500 of determining the flash power statistic FP is described below with reference to FIGS. 15A and 15B.

In a following step 1432 the processor 806 determines whether the flash power statistic FP is within acceptable levels. This is achieved by comparing the flash power statistic FP to a flash power threshold denoted by the symbol $T^{FP}$. If the flash power statistic FP is less than the flash power threshold $T^{FP}$ then it is likely that the power of the flash 812 illuminating the flash image FI will be insufficient to obtain an accurate white point estimate for the no-flash image NFI using the flash-no-flash method. If this situation is detected by step 1432, then the method 1400 proceeds to the step 1454 in FIG. 4C. In one embodiment, the flash power threshold is $T^{FP}=0.5$, however depending on how the flash power statistic FP is calculated, other values of the flash power threshold $T^{FP}$ can also be used.

The step 1454 in FIG. 4C performs conventional white-balancing of the no-flash image NFI. This step can use information from the no-flash image NFI, the flash image FI, the WB sensor 810, user selected white balance coefficients, or other white balance information. For example, the step 1454 may white balance the reconstructed no-flash image NFI' using the white balance data from the WB sensor 810 according to the following equations (36), (37) and (38):

$$NFI''(x,y)_r = NFI'(x,y)_r I_r^{D50}/WB_r \quad (36)$$

$$NFI''(x,y)_g = NFI'(x,y)_g I_g^{D50}/WB_g \quad (37)$$

$$NFI''(x,y)_b = NFI'(x,y)_b I_b^{D50}/WB_b \quad (38)$$

where:

NFI'(x, y)$_r$, NFI'(x, y)$_g$ and NFI'(x, y)$_b$ represent the red, green, and blue color component values of the pixel at the position (x,y) to be modified in the reconstructed no-flash image NFI';

NFI''(x, y)$_r$, NFI''(x, y)$_g$ and NFI''(x, y)$_b$ represent the red, green, and blue color component values, respectively, of the pixel at the position (x,y) in the corrected (or white balanced) no-flash image NFI'';

$WB_r$, $WB_g$, and $WB_b$ represent the response of the WB sensor 810 to the external illuminant in the camera's red, green, and blue spectral bands, respectively; and $I_r^{D50}$, $I_g^{D50}$, and $I_b^{D50}$ represent the color response of the camera 800 to the standard "D50" illuminant (normalized to a luminance of unity) in the red, green, and blue spectral bands, respectively.

In one embodiment, the step 1454 can apply the flash-no-flash white balance method and display a warning on the display 807 to indicate that the result may be in error so that the user can select a more suitable white balance method using the user interface 808.

Returning to the step 1432, if the flash power statistic FP is greater than or equal to $T^{FP}$, then the power of the flash illuminating the flash image FI is sufficient to obtain an accurate white point estimate for the no-flash image using the flash-no-flash method. In this event, the method 1400 proceeds to step 1440 as seen in FIG. 14C.

In step 1440, the processor 806 determines a plurality of local color transform values that can be used to chromatically adapt color component values at the determined pixel locations in the reconstructed no-flash image NFI' to match the corresponding to color values in the corrected flash-only image FOI''. The method 300 described above with reference to FIG. 3, may be used to implement the step 1440 for determining local color transform values to chromatically adapt color values in the reconstructed no-flash image NFI' to corresponding color values in the corrected flash-only image FOI''.

At a next step 1450, the processor 806 determines averaged local color transform values for the reconstructed no-flash image NFI' by selectively aggregating the local color transform values determined at the step 1440 and then determining the average of the aggregated local color transform values. The averaged local color transform values are denoted by the symbols ($\bar{I}_r^a$, $\bar{I}_g^a$, $\bar{I}_b^a$). The method 400 as described above with reference to FIG. 4, may be used to implement the step 1450 for selectively aggregating the local color transform values.

Then at the next step 1451, the processor 806 uses the reconstructed no-flash image NFI', the reconstructed and scaled flash image FI', and the results of the step 1450 to compute four statistical measures as follows.

Three of the statistical measures are white balance (WB) confidence statistics, denoted by the symbols $WBC_r$, $WBC_g$, $WBC_b$. The WB confidence statistics give measures of the level of uncertainty in the averaged local color transform values calculated in the step 1450 in each of the red, green and blue spectral bands. If the WB confidence statistics indicate that there are high levels of uncertainty in the averaged local color transform values, then the results of the flash-no-flash white balance method may be poor.

The fourth statistical measure is a backlight statistic, denoted by the symbol BC. A backlight region, for the purposes of this description, is a region in the scene that is illuminated by a strong ambient light source with a different color to the ambient light source illuminating the foreground objects in the scene. The flash unit 812 on the camera 800 has little effect on the backlight region, since the region under consideration is generally too far away for the flash to reach, or alternately too bright for the flash to have a visible effect. For this reason accurate scene color estimation in backlight regions is problematic when using the flash-no-flash white balance method.

One example of a backlight scenario has a foreground subject illuminated by an incandescent light, and in the background a window looking out onto bright daylight is in the same scene captured by the digital camera. In this example, the region of the window is a backlight region. If the white balance is adjusted to suit the incandescently lit foreground subject, the white balance will be incorrect for the backlight region of the window, giving the backlight region an undesirable blue tint.

The backlight statistic gives a measure of the likelihood that a backlight region will have an unnatural color after the flash-no-flash white balance method is applied. A method 1600, which can be used in implementing the step 1451 for determining the backlight statistic, will be described with reference to FIGS. 16, 17A and 17B.

Reviewing the described methods, the regions identified by the processing mask MI in the image NFI' captured without the flash 812 are compared to the corrected flash-only image FI'. The results of this comparison are be used to estimate a white point for the no-flash image NFI. The method 1400 determine measures of the reliability of the white point estimate and a measure of the likelihood that a backlight region in the imagery will produce an undesirable color shift following the flash-no-flash white balancing step. If any of the measures are outside their respective acceptable ranges, processing proceeds to apply a more conventional method of white balance and terminates, otherwise processing proceeds to use the white point estimated by the flash-no-flash method to optimally correct the no-flash image to remove any color bias.

Returning to FIG. 14C, in the step 1452, the processor 806 tests whether the WB confidence statistics $WBC_r$, $WBC_g$, and $WBC_b$ and the backlight statistic BC are within acceptable levels. This is achieved by comparing the WB confidence statistics to respective WB confidence thresholds and comparing the backlight statistic BC to a backlight threshold.

The WB confidence thresholds are denoted by the symbols $T_r^{WBC}$, $T_g^{WBC}$, and $T_b^{WBC}$ and the backlight threshold is denoted by the symbol $T^{BC}$. In one embodiment, each statistic determined in the step 1451 is compared to its respective threshold in the step 1452.

It is likely that the flash-no-flash white balance method will produce undesirable results if the following conditions are met:
  any of the WB confidence statistics $WBC_r$, $WBC_g$, and $WBC_b$ are less than their respective WB confidence thresholds $T_r^{WBC}$, $T_g^{WBC}$, and $T_b^{WBC}$; OR
  the backlight statistic BC is greater than the backlight threshold $T^{BC}$.

If these conditions are met, then the method 1400 proceeds to step 1454 following step 1452. Following step 1454, the method 1400 concludes.

On the other hand, it is likely that the flash-no-flash white balance method will produce desirable results if the following conditions are met:
  all of the WB confidence statistics $WBC_r$, $WBC_g$, and $WBC_b$ are greater than or equal to their respective WB confidence thresholds $T_r^{WBC}$, $T_g^{WBC}$, and $T_b^{WBC}$; AND
  the backlight statistic BC is less than or equal to backlight threshold $T^{BC}$.

If these conditions are met, then the method 1400 proceeds to 1453 following step 1452.

In one embodiment, the WB confidence thresholds are $T_r^{WBC}=2$, $T_g^{WBC}=2$, and $T_b^{WBC}=2$, and the backlight threshold is $T^{BC}=0$. However, depending on how the WB confidence statistics $WBC_r$, $WBC_g$, and $WBC_b$ and the backlight statistic BC are determined, other values of the WB confidence thresholds $T_r^{WBC}$, $T_g^{WBC}$, and $T_b^{WBC}$ and the backlight threshold $T^{BC}$ may be used.

In step 1453, the averaged local color transform values, ($\bar{I}_r^a, \bar{I}_g^a, \bar{I}_b^a$), are applied globally to the reconstructed no-flash image NFI' to produce the corrected no-flash image NFI". The color values for a single pixel (x,y) of the corrected no-flash image NFI" are determined in the step 1453 using the "RGB scaling" method of chromatic adaptation described above with reference to Equations (22), (23) and (24). The method 1400 concludes following step 1453.

Following the step 1425 of the method 1400 in FIG. 14B, the mask image MI will contain zeros for any pixel that has been determined to be saturated or noisy, and all other pixels in the MI will be marked by 1.0.

As described above, the function min( ) returns a smallest component value from each of the red, green and blue component values of a pixel. Similarly the function max( ) described above returns a largest component value from each of the red, green and blue component values of a pixel. Alternative methods for determining the processing mask MI can be used. For example, the min( ) and max( ) functions of Equations (12) and (13) can be replaced by other pixel measures such as luminance or norm.

Figure 15A:
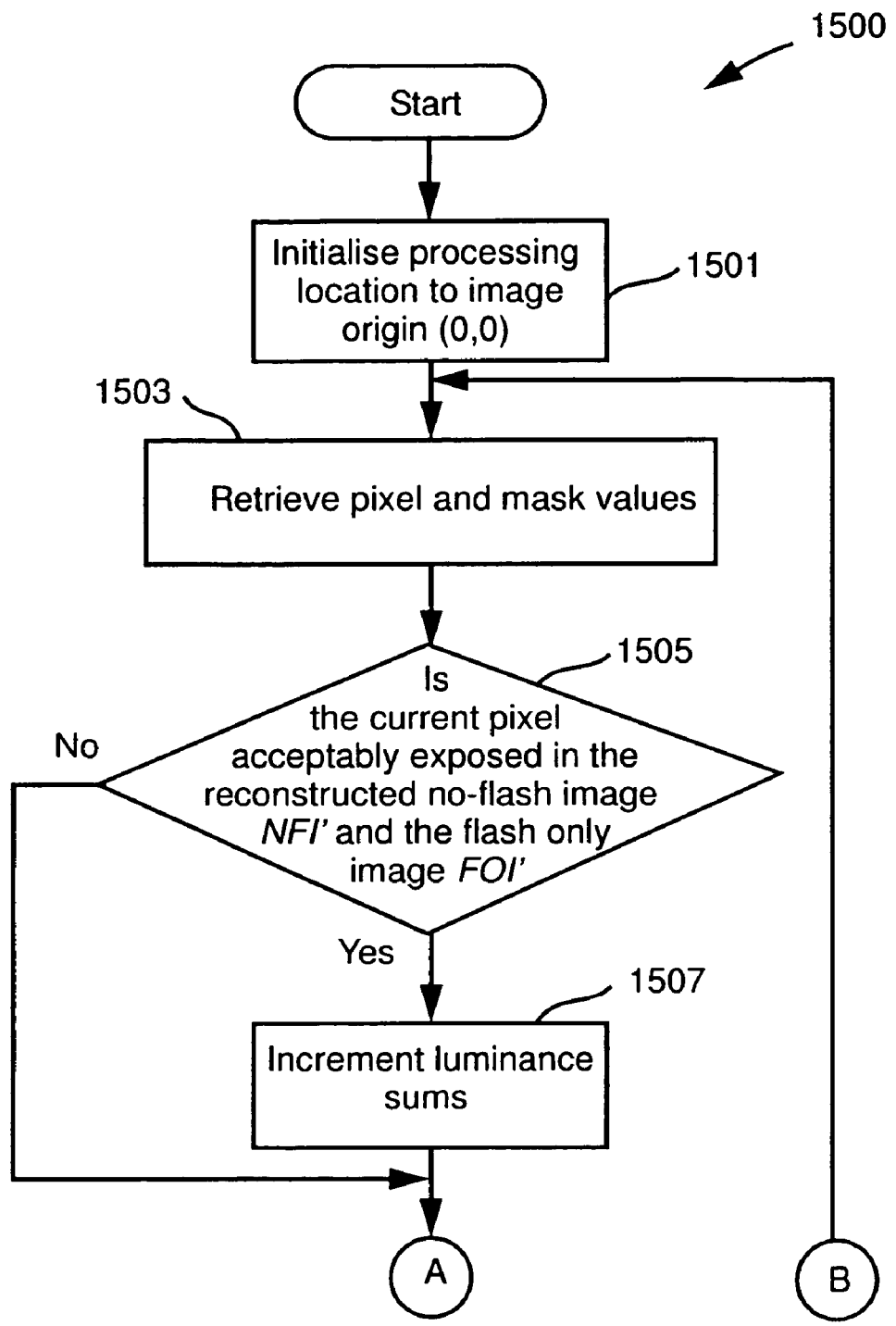
FIGS. 15A-15B are process flow diagram fragments showing a method of determining the degree of flash illumination of the image captured using the flash illuminant.
Figure 15B:
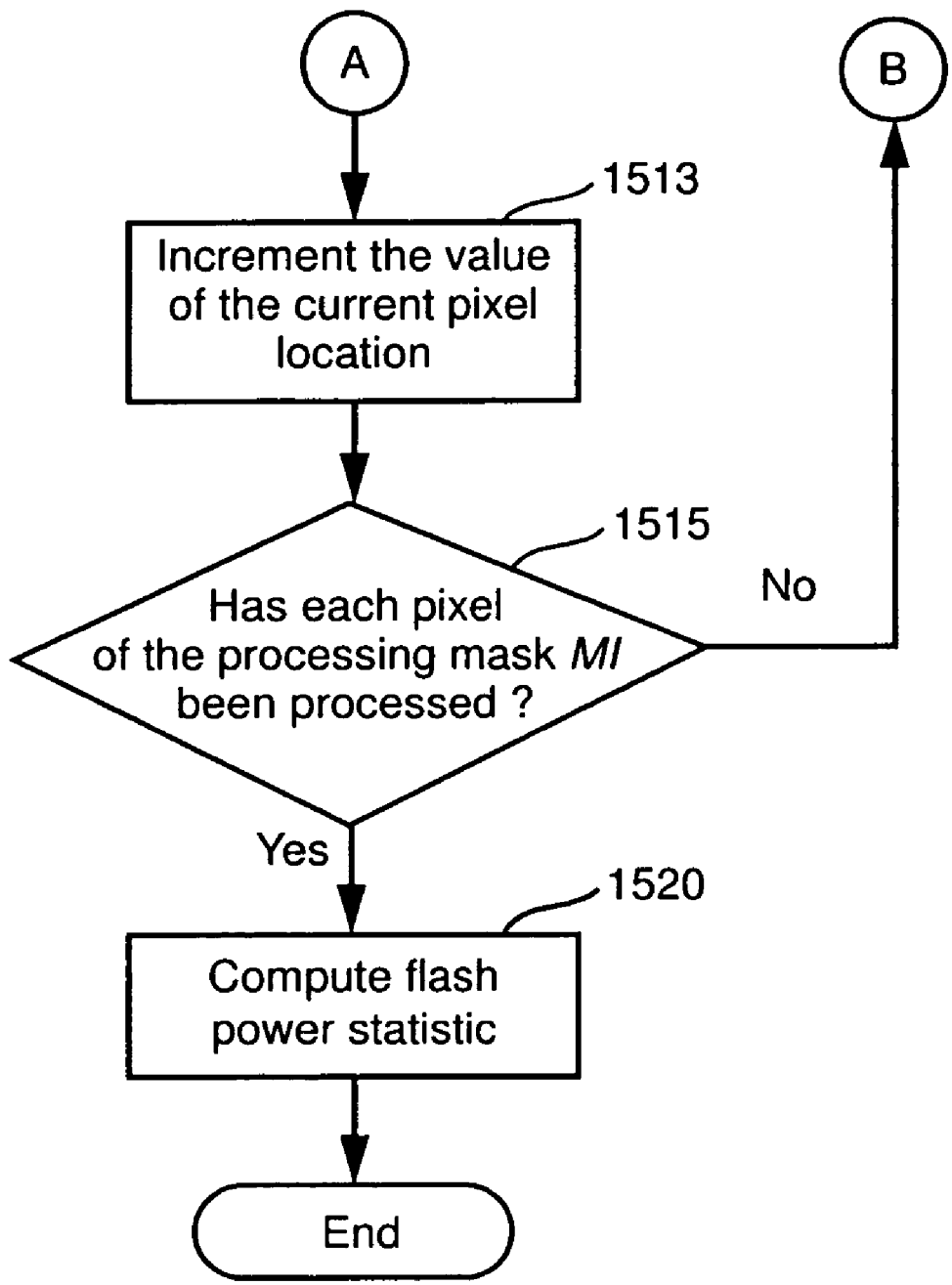

FIGS. 15A and 15B show a method 1500 for determining the flash power statistic FP, as executed at step 1312. The method 1500 may be implemented as software resident in the ROM 811, the software being controlled in its execution by the processor 806.

In the method 1500, pixel locations that are well-exposed in both the reconstructed no-flash image NFI' and the flash-only image FOI', as indicated by the processing mask image MI, are processed and an estimate of the flash power statistic is determined. The steps of the method 1500 are applied to pairs of pixels from corresponding locations in the reconstructed no-flash image NFI' and the corrected flash-only image FOI'.

As seen in FIG. 15A, the method 1500 begins at step 1501, where the processor 806 initializes a pixel location (x,y) to an image origin (0,0). At this point the variables $\bar{L}_{FO}$ and $\bar{L}_{NF}$ are each initialized to zero. In a following step 1503 the processor 806 retrieves pixel values from NFI'(x, y), FOI'(x, y) and MI(x,y). In a following step 1505, if the processor 806 determines that the value of MI(x,y) is a non-zero value, indicating that the pixel at the current pixel location is acceptably exposed in both the reconstructed no-flash image NFI' and the flash-only image FOI', then the method 1500 proceeds to a step 1507. Otherwise, if the method 1500 proceeds to step 1513.

Returning to the step 1507, here the luminance of the corresponding pixels in the reconstructed no-flash image NFI' and the flash-only image FOI' are determined in accordance with Equation follows:

$$L_{FO}(x,y)=0.3FOI'(x,y)_r+0.59FOI'(x,y)_g+0.11FOI'(x,y)_b \qquad (39)$$

$$L_{NF}(x,y)=0.3NFI'(x,y)_r+0.59NFI'(x,y)_g+0.11NFI'(x,y)_b \qquad (40)$$

where:
  the subscripts r, g, and b represent the respective red, green and blue color components of the pixel;
  $L_{FO}(x, y)$ denotes the luminance of the pixel at location (x, y) in the flash-only image FOI'; and
  $L_{NF}(x, y)$ denotes the luminance of the pixel at location (x, y) in the reconstructed no-flash image NFI'.

The coefficients of 0.3, 0.59 and 0.11 in the Equations (39) and (40) are selected to determine the luminance of a pixel based on the red, green, and blue color components of the pixel assuming serge chromaticities. Alternatively, for any given camera sensitive to N spectral bands, a suitable set of N coefficients may be determined based on the spectral sensitivities of the particular camera. The luminance variables $L_{FO}(x, y)$ and $L_{NF}(x, y)$ of the current pixel location are then added to the variables $\bar{L}_{FO}$ and $\bar{L}_{NF}$.

Returning to the step 1505, if the processor 806 determines that the value of MI(x,y) is a zero value, indicating that the current pixel location is unacceptably exposed in either the reconstructed no-flash image NFI' or the flash-only image FOI' then the method 1500 proceeds to step 1513.

As seen in FIG. 15B, at step 1513, the processor 806 increments the value of the current pixel location (x,y) in a raster scan order. Then at a next step 1515, if the processor 806 determines that each pixel of the processing mask image MI has been processed then the method 1500 proceeds to step 1520. Otherwise, the method 1500 returns step 1503.

At the step 1520, the processor 806 determines the flash power statistic using Equation (41) as follows:

$$FP = \frac{\overline{L}_{FO}}{\overline{L}_{NF}} \quad (41)$$

where:

FP is the flash power statistic; and $\overline{L}_{FO}$ is the sum of the luminances of pixels in the flash-only image FOI' that are acceptably exposed in both the reconstructed no-flash image NFI' and the flash-only image FOI'.

$\overline{L}_{FO}$ is hence proportional to the brightness of the flash for pixels that will be subsequently used to determine the white balance using the flash-no-flash method. The variable $\overline{L}_{NF}$ is the sum of the luminance of pixels in the reconstructed no-flash image NFI' that are acceptably exposed in both the reconstructed no-flash image NFI' and the flash-only image FOI'. The variable $\overline{L}_{NF}$ is hence proportional to the brightness of the ambient light for pixels that will be subsequently used to determine the white balance using the flash-no-flash method. The flash power statistic FP is hence the ratio of flash brightness in the flash-only image FOI' and ambient light brightness in the reconstructed no-flash image NFI'. If the flash power statistic is greater than 1.0, the flash in the flash image FI had more effect than the ambient light on the foreground subject in the captured images. If the flash power statistic is less than 1.0, the flash in the flash image FI had less effect than the ambient light on the foreground subject in the captured images.

The flash-no-flash method relies on the fact that the flash illumination in the image FI captured with the flash is bright enough to accurately measure the scene colors. In one embodiment, if the flash power statistic FP is greater than 0.5 then the level of flash power in the flash image FI is considered to be great enough to allow an accurate white balance using the flash-no-flash white balance method.

The above description represents one arrangement for using the flash power statistic FP, however other methods may be used to obtain the same result. For example, if a camera has a sensor to detect the intensity of the flash light bounced off objects in a scene, that value may be incorporated into the calculation of the flash power statistic FP.

Returning to FIG. 14C, it is recalled that the step 1450 described the selective aggregation of local color transform values to produce the averaged local color transform values. The method 500 described above shows one example of an aggregation method. The aggregation method 500 involves dividing the processing mask image MI into non-overlapping blocks and only including in the aggregate local color transform values from blocks that satisfy a statistical criterion in each color plane. The aggregation procedure removes noisy estimates from contributing to the averaged local color transform values.

However, if the local color transform values are excessively noisy, too few local color transform values may be aggregated when implementing the step 1450 in FIG. 14C. In this case the results of the flash-no-flash white balance may be poor, due to too few local color transform values being used to determine the averaged local color transform values. In one embodiment, the WB confidence statistics are the ratios of local color transform values selected for inclusion in the aggregate by the method 500 over the total number of local color transform values determined in the step 1440 in FIG. 14C in each color plane. For a camera which is sensitive to N spectral bands, the step 1451 in FIG. 14C determines N WB confidence statistics. In the above example of a camera that is sensitive to three spectral bands denoted red, green, and blue, the WB confidence statistics are determined in accordance with Equations (42), (43) and (44) as follows:

$$WBC_r = \frac{LC'_r}{LC_r} \times 100 \quad (42)$$

$$WBC_g = \frac{LC'_g}{LC_g} \times 100 \quad (43)$$

$$WBC_b = \frac{LC'_b}{LC_b} \times 100 \quad (44)$$

where:

$LC_r$, $LC_g$, and $LC_b$ are respectively the total number of local color transform values determined in the step 1440 in FIG. 14C in the camera's red, green and blue spectral bands;

$LC'_r$, $LC'_g$, and $LC'_b$ denote the total number of local color transform values selectively aggregated in the step 1450 in FIG. 14C in the camera's red, green and blue spectral bands; and $WBC_r$, $WBC_g$ and $WBC_b$ denote the WB confidence statistic in the camera's red, green and blue spectral bands respectively.

The flash-no-flash method relies on the averaged local color transform values computed in the step 1450 in FIG. 14C being of sufficient accuracy. The WB confidence statistics give the percentage of local color transform values that were not rejected by the selective aggregation performed in step 1450. If this percentage is too low, the averaged local color transform values are likely to be inaccurate. In the present arrangement, if all of the WB confidence statistics are greater than 2 then the level of accuracy of the averaged local color transform is considered great enough to allow an accurate white balance using the flash-no-flash white balance method.

The above description represents one embodiment of the method to determine the WB confidence statistics. Many methods may be used to obtain the same result by determining a measure of confidence in the averaged local color transform values or the local color transform values in general. For example, the variances or standard deviations of the local color transform values selectively aggregated by step 1450 may be determined and used to determine the WB confidence statistics.

There are three main criteria that must be met by a backlight region to cause the flash-no-flash method to produce an undesirable result. Firstly, the backlight region must be large enough and bright enough to be noticed by a person viewing the image. Secondly, the backlight region must be illuminated by a light source with a color substantially different from the light source illuminating the foreground subjects. Thirdly, after the averaged local color values are used to adjust the white point of the backlight region, the backlight region must have an undesirable color tint.

In one embodiment, the backlight region is considered to have an undesirable color tint, if average color of the backlight region moves away from gray after the flash-no-flash white balance has been applied.

Figure 16:
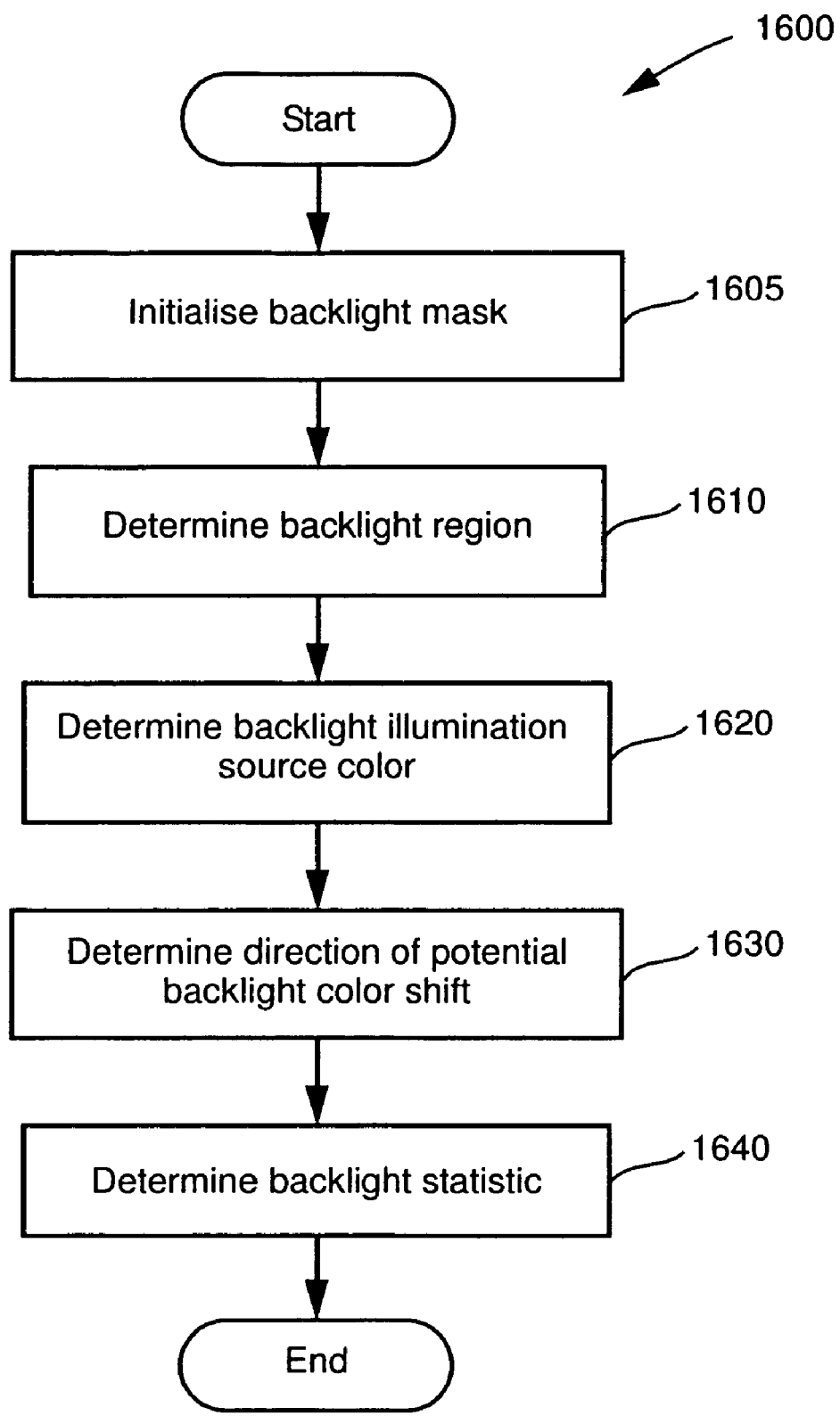
FIG. 16 is a flow diagram showing a method of determining the likelihood that backlight regions in the image captured without the flash will appear with an undesirable color bias after the conditional white balancing method described in FIGS. 14A-14C is applied.

FIG. 16 shows a method 1600 for determining the backlight statistic BC. The method 1600 may be implemented as software resident in the ROM 811, the software being controlled in its execution by the processor 806. The process 1600 may be used in implementing the step 1451 in FIG. 14C.

The method 1600 begins at step 1605, where the processor 806 initializes a backlight mask. The backlight mask is denoted by the symbol BM. The backlight mask BM is the same size as the reconstructed no-flash image NFI' and the reconstructed scaled and registered flash image FI'. The backlight mask is initialized to contain zero in every element.

The method 1600 then proceeds to step a 1610, where the processor 806 examines the reconstructed no-flash image NFI' and the reconstructed scaled and registered flash image FI' to determine the pixel locations belonging to a backlight region. Each pixel location is visited and tested. The luminance of the pixels in the reconstructed no-flash image NFI' and the reconstructed scaled and registered flash image FI' corresponding to the current pixel location are determined using Equations (45) and (46):

$$NFL(x,y)=0.3NFI'(x,y)+0.59NFI'(x,y)+0.11NFI'(x,y) \quad (45)$$

$$FL(x,y)=0.3FI'(x,y)+0.59FI'(x,y)+0.11FI'(x,y) \quad (46)$$

where NFL(x,y) and FL(x,y) denote the luminance of the pixel at location (x,y) in the reconstructed no-flash image NFI' and the reconstructed scaled and registered flash image FI', respectively.

A pixel location (x,y) is determined to belong to a backlight region if it satisfies two conditions as follows:

Condition 1:

$$NFL(x,y) > Z_1$$

Condition 2:

$$FL(x,y) \leq Z_2 \times NFL(x,y)$$

The Condition 1 states that the luminance of the pixel at location (x,y) in the reconstructed no-flash image NFI' should be greater than a constant $Z_1$. This condition ensures that regions that are very dark are not classified as backlight regions. The second condition states that pixels in a backlight region in the reconstructed scaled and registered flash image FI' should not be brighter than some fraction of the luminance of the corresponding pixel in the reconstructed no-flash image NFI'. The fraction is given by the constant $Z_2$.

The Condition 2 accounts for the fact that backlight regions are characterized partly by the fact that the light from the flash unit does not reach these regions. Hence backlight regions should not appear significantly brighter in the reconstructed scaled and registered flash image FI' than they appear in the reconstructed no-flash image NFI'.

Every pixel location (x,y) that satisfies both the Condition 1 and the Condition 2 is classified as belonging to a backlight region and the corresponding pixel location (x,y) in the backlight mask BM is set to one. In one embodiment, $Z_1=0$ and $Z_2=1.1$, however the optimal values of $Z_1$ and $Z_2$ will depend on the particular camera 800 in question.

The process 1600 then proceeds to a step 1620 in which the processor 806 estimates the color of the backlight illuminant. This is the same as the white point of the backlight region identified by the backlight mask BM. Any suitable method to estimate the white point of an image may be used to determine the color of the backlight illuminant. In one embodiment, the "Gray World" method is used at step 1620.

Figure 17A:
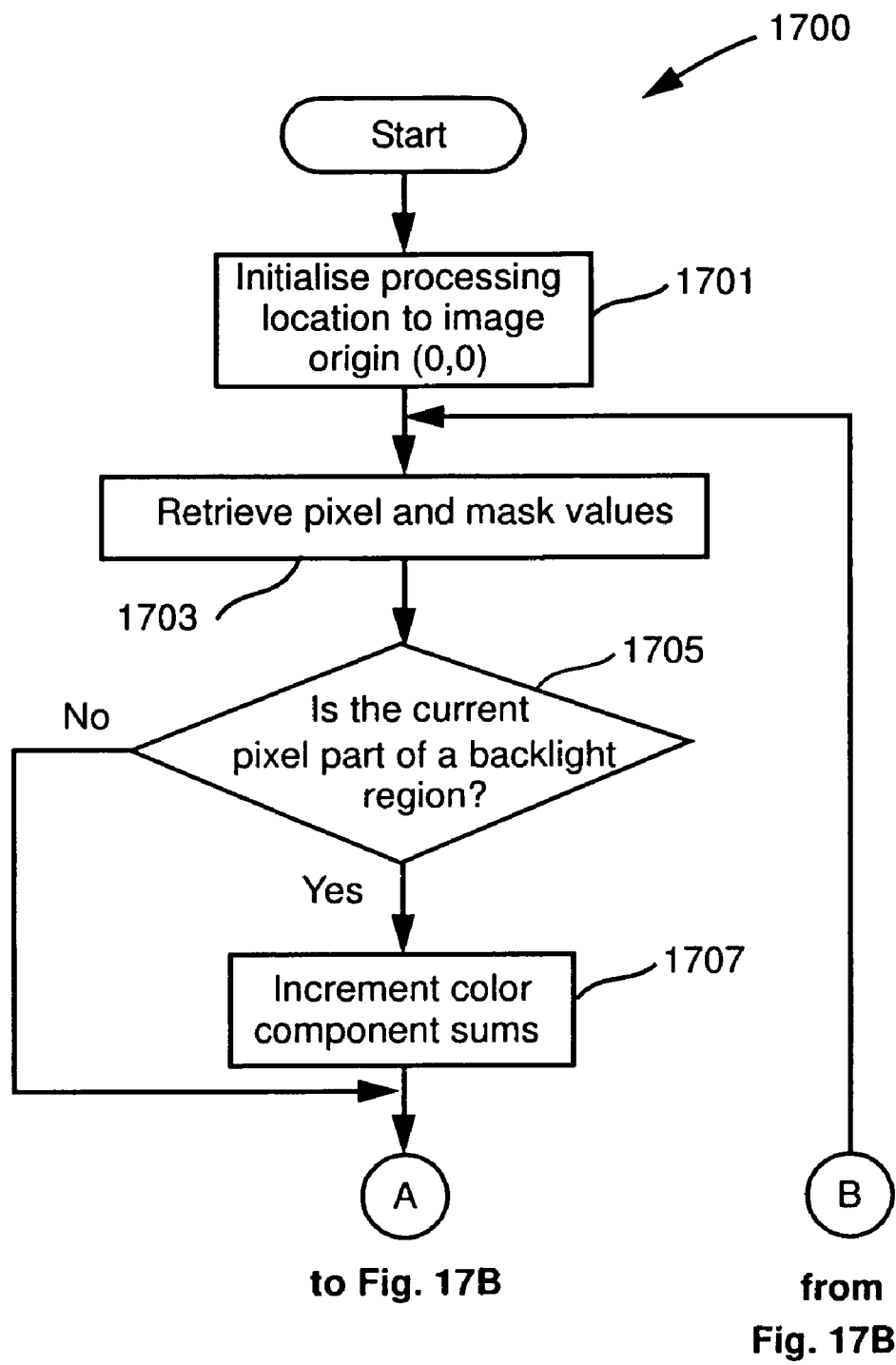
FIGS. 17A-17B are process flow diagram fragments showing a method of determining the color of the illuminant in a backlight region.
Figure 17B:
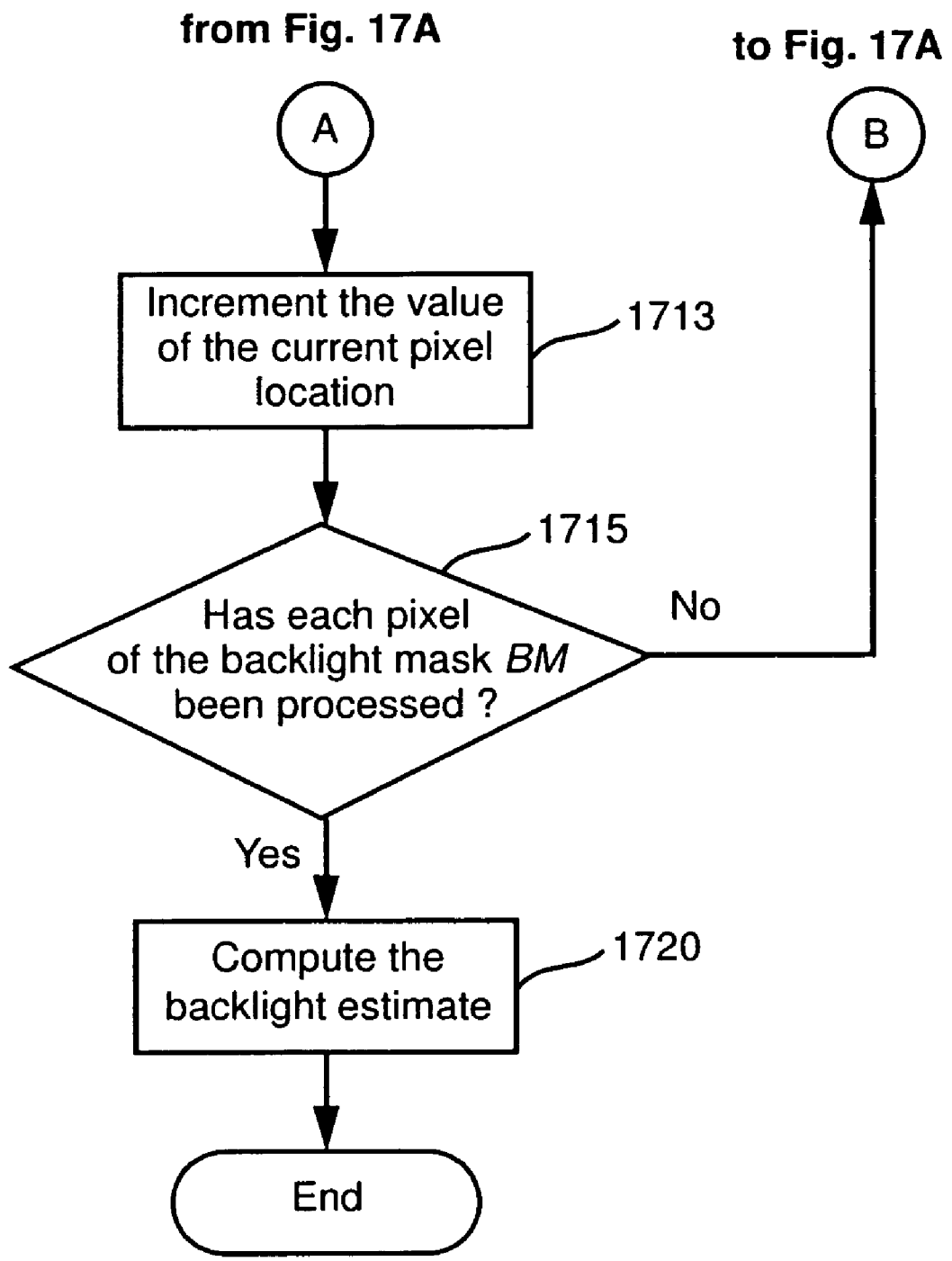

FIGS. 17A and 17B show a method 1700 for implementing the "Gray World" method. The backlight estimate is denoted by the symbols ($\bar{I}_r^{bl}, \bar{I}_g^{bl}, \bar{I}_b^{bl}$), where $\bar{I}_r^{bl}, \bar{I}_g^{bl}$ and $\bar{I}_b^{bl}$ represent the red, green, and blue components of the backlight estimate, respectively.

As seen in FIG. 17A, the method 1700 begins at step 1701, where the processor 806 initializes a pixel location (x,y) to an image origin (0,0). In this step the variables $\bar{I}_r^{bl}, \bar{I}_g^{bl}$ and $\bar{I}_b^{bl}$ are each initialized to zero. In a following step 1703, the processor 806 retrieves pixel values from NFI'(x,y) and BM(x,y). Then in a following testing step 1705, if the processor 806 determines that the value of BM(x,y) is a non-zero value, indicating that the pixel at the current pixel location has been determined to belong to a backlight region by step 1610, then the method 1700 proceeds to a step 1707. Otherwise, the method 1700 proceeds to step 1713.

The step 1707 in FIG. 17A determines the normalized color of the pixel at the current pixel location in the reconstructed no-flash image NFI' by normalizing the luminance of the pixel to unity in accordance with Equations (47), (48) and (49), as follows:

$$I(x,y)_r^{bl} = \frac{NFI'(x,y)_r}{0.3NFI'(x,y)_r + 0.59NFI'(x,y)_g + 0.11NFI'(x,y)_b} \quad (47)$$

$$I(x,y)_g^{bl} = \frac{NFI'(x,y)_g}{0.3NFI'(x,y)_r + 0.59NFI'(x,y)_g + 0.11NFI'(x,y)_b} \quad (48)$$

$$I(x,y)_b^{bl} = \frac{NFI'(x,y)_b}{0.3NFI'(x,y)_r + 0.59NFI'(x,y)_g + 0.11NFI'(x,y)_b} \quad (49)$$

where the subscripts r, g, and b respectively represent the red, green and blue color components of the pixel.

Since the effect of the pixel's luminance has been compensated for, the symbols $I(x,y)_r^{bl}, I(x,y)_g^{bl}$ and $I(x,y)_b^{bl}$ denote the color components of the current pixel. The color components are then used in the step 1707 to update the backlight estimate in accordance with Equation (50), (51) and (52), as follows:

$$\bar{I}_r^{bl} = \bar{I}_r^{bl} + I(x,y)_r^{bl} \quad (50)$$

$$\bar{I}_g^{bl} = \bar{I}_g^{bl} + I(x,y)_g^{bl} \quad (51)$$

$$\bar{I}_b^{bl} = \bar{I}_b^{bl} + I(x,y)_b^{bl} \quad (52)$$

As noted, if in the step 1705 the processor 806 determines that the value of BM(x,y) is a zero value, indicating that the current pixel location has been determined to not belong to a backlight region by the step 1610, then the method 1700 proceeds to the step 1713.

As seen in FIG. 17B, at step 1713, the processor 806 increments the value of the current pixel location (x,y) in a raster scan order. Then at a following testing step 1715, if the processor 806 determines that each pixel of the processing mask image BM has been processed then the method 1700 proceeds to a step 1720 after which the method 1700 concludes. Otherwise, the method 1700 returns to the step 1703.

In the step 1720, the processor 806 adjusts the backlight estimate to compensate for the number of non-zero pixels in the backlight mask BM using Equations (53)-(55) as follows:

$$\bar{I}_r^{bl} = \frac{\bar{I}_r^{bl}}{BMcount} \quad (53)$$

$$\bar{I}_g^{bl} = \frac{\bar{I}_g^{bl}}{BMcount} \quad (54)$$

$$\bar{I}_b^{bl} = \frac{\bar{I}_b^{bl}}{BMcount} \quad (55)$$

where BMcount is the number of non-zero elements in the backlight mask BM.

As a consequence of performing the method 1700, the backlight estimate ($\bar{I}_r^{bl}, \bar{I}_g^{bl}, \bar{I}_b^{bl}$) contains the estimate of the color of the light source illuminating the backlight region in the scene.

In one embodiment, the backlight estimate is determined from the reconstructed no-flash image NFI'. However, it may be determined from any of the flash or no-flash images of the scene described above such as the flash image FI.

Returning to FIG. 16, the method 1600 proceeds from the step 1620 to a step 1630 which predicts the direction that the backlight color shift BLshift would take if the flash-no-flash white balance method would be applied in a step 1453 (see FIG. 14C). The color of the backlight region may shift toward or away from "gray" after the step 1453. The reference gray may be any suitable gray color mapped to the camera's color space. For the purposes of illustration, D50 is considered as the standard gray (white) given by the symbols $I_r^{D50}, I_g^{D50}$, and $I_b^{D50}$. The distance between the backlight estimate and the standard gray D50 before step 1453 is given by:

$$\text{predist} = (\bar{I}_r^{bl} - I_r^{D50})^2 + (\bar{I}_g^{bl} - I_g^{D50})^2 + (\bar{I}_b^{bl} - I_b^{D50})^2$$

The distance after step 1453 is estimated as:

$$\text{postdist} = \left(\frac{\bar{I}_r^{bl}}{\bar{I}_r^a} - I_r^{D50}\right)^2 + \left(\frac{\bar{I}_g^{bl}}{\bar{I}_g^a} - I_g^{D50}\right)^2 + \left(\frac{\bar{I}_b^{bl}}{\bar{I}_b^a} - I_b^{D50}\right)^2$$

where the symbols ($\bar{I}_r^a, \bar{I}_g^a, \bar{I}_b^a$) denote the color of the ambient illuminant determined in the step 150 above. The backlight color shift is given by:

$$BL\text{shift} = \text{postdist} - \text{predist}$$

Returning to FIG. 16, the method 1600 then proceeds to step a 1640 that determines the backlight color difference using Equation (56) as follows:

$$BL\text{diff} = \sqrt{\frac{(\bar{I}_r^{bl} - \bar{I}_r^a)^2}{(\sigma_r^a)^2 + (\sigma_r^{bl})^2} + \frac{(\bar{I}_g^{bl} - \bar{I}_g^a)^2}{(\sigma_g^a)^2 + (\sigma_g^{bl})^2} + \frac{(\bar{I}_b^{bl} - \bar{I}_b^a)^2}{(\sigma_b^a)^2 + (\sigma_b^{bl})^2}} \quad (56)$$

where:

BLdiff denotes the backlight color difference;

$\sigma_r^a$, $\sigma_g^a$, and $\sigma_b^a$ denote the standard deviations of the estimate of the color of the ambient illuminant determined in the step 1450 of FIG. 14C; and $\sigma_r^{bl}$, $\sigma_g^{bl}$, and $\sigma_b^{bl}$ denote the standard deviations of the estimate of the backlight color determined in the step 1620 of FIG. 16.

Although Equation (56) is the preferred method of determining the backlight color difference BLdiff other measure of distance may be used such as Euclidean distance.

The step 1640 then sets the backlight statistic based upon the following three conditions:

Condition 4:

$$\frac{BM\text{count}}{T\text{count}} > Y_1$$

Condition 5:
  BLshift>$Y_2$

Condition 6:
  BLdiff>$Y_3$ where Tcount denotes the total number of pixels in no-flash image NFI.

Condition 4 states that the ratio of the number of backlight region pixels to the total number of image pixels should be larger than $Y_1$. Condition 5 states that the value of the backlight color shift BLshift should be greater than $Y_2$. Condition 6 states that the value of the backlight color difference BLdiff should be greater than $Y_3$.

If all three conditions are satisfied, then the backlight statistic BC is set to one. If any or all of the conditions are not satisfied, then the backlight statistic BC is set to zero.

Returning to FIG. 14C, if the backlight statistic BC is equal to one after step 1640, then the flash-no-flash white balance method is likely to result in a corrected no-flash image NFI" with a visible backlight region with an unnatural tint. Under this condition, the step 1452 directs the method 1400 to the step 1454 which implements an alternative method of white balancing the no-flash image NFI. If the backlight statistic BC is equal to zero after step 1640 then the flash-no-flash white balance method is unlikely to result in a corrected no-flash image NFI" with a visible backlight region with an unnatural tint.

In one embodiment, $Y_1$=0.02, $Y_2$=0, and $Y_1$=3. However, different implementations may require different values for these parameters.

Returning to FIG. 16, following the step 1640, the method 1600 concludes.

In an alternate embodiment, and particularly with reference to FIGS. 14A-14C, all of the steps of the method 1400 are identical apart from the step 1454.

In the step 1454 of an alternate method, instead of using a known single image white balance method such as "Gray World" to compute every component of the white point of the no-flash image NFI, the known white balance method is only used to compute those components of the white point of the no-flash image NFI for which the corresponding WB confidence statistics $WBC_r$, $WBC_g$, and $WBC_b$ have fallen below the corresponding WB confidence thresholds, $T_r^{WBC}$, $T_g^{WBC}$, and $T_b^{WBC}$.

For example, if $WBC_r$ is less than $T_r^{WBC}$, but $WBC_g$ and $WBC_b$ are within acceptable ranges, then the red component of the white point of the no-flash image would be computed by some suitable alternative method of white balance such as "Gray World" whilst the green and blue components of the white point of the no-flash image NFI are computed using the step 1453.

In a further alternate embodiment, all of the steps of the method 1400 are identical apart from the steps 1450 and 1454. In step 1450 of the alternate arrangement, in addition to calculating the average of the selective aggregate of the local color transform values, the step 1450 also calculates and stores the average of all of the local color transform values without the selective aggregation method described in the process 500 of FIG. 5. Denoting this average as the "total averaged local color transform values", then in the (alternate) step 1454, instead of using a known single image white balance method such as "Gray World" to compute every component of the white point of the no-flash image NFI, the total averaged local color transform values are used for those components of the white point of the no-flash image NFI for which the corresponding WB confidence statistics $WBC_r$, $WBC_g$, and $WBC_b$ have fallen below the corresponding WB confidence thresholds, $T_r^{WBC}$, $T_g^{WBC}$, and $T_b^{WBC}$ as per the second alternate arrangement above.

It should be noted that the proposed method described above to determine the suitability of a flash-no-flash pair for conditional white balancing is not restricted to the disclosed flash-no-flash white balance method, and may be modified to be used with other white balance methods making use of a flash image to aid the white balance determination for a no-flash image. In particular, a further alternate embodiment uses another flash-no-flash white balance method. This alternate arrangement is described below with reference to FIG. 13. In this alternate arrangement all of the steps in FIG. 13 remain the same, except for steps 1314 and 1315 which are modified as described below.

In step the 1314 average color estimates are computed for the corrected flash-only image FOI" and the no-flash image NFI using the "Gray World" algorithm described above in relation to FIGS. 17A and 17B. The description associated with FIGS. 17A and 17B is directed to the "Gray World" method as it is applied in order to estimate the white point of the backlit region in the no-flash image. However, in the present alternate arrangement, the "Gray World" method is used to estimate the average color over all well exposed regions (as determined by the mask image MI) in the corrected flash-only and no-flash images (FOI" and NFI, respectively). While computing the average color estimates of the no-flash image NFI and the corrected flash-only image FOI", the (modified) step 1414 also records the variances of the two average color estimates in each of the color components. The average color estimates of the corrected flash-only image are respectively denoted as $AFI_r$, $AFI_g$, $AFI_b$ in the red, green, and blue color components. The variances of the average color estimates in each color component for the corrected flash-only image are respectively denoted as $VFI_r$, $VFI_g$, $VFI_b$ in the red, green, and blue color components. The average color estimates of the no-flash image are respectively denoted as $ANFI_r$, $ANFI_g$, $ANFI_b$ in the red, green, and blue color components. The variances of the average color estimates in each color component for the no-flash image are respectively denoted by $VNFI_r$, $VNFI_g$, $VNFI_b$ in the red, green, and blue color components. The final white point estimate of the no-flash image NFI, is determined in accordance with Equations (57), (58) and (59) as follows:

$$\bar{I}_r^a = \frac{ANFI_r \times I_r^{D50}}{AFI_r} \tag{57}$$

$$\bar{I}_g^a = \frac{AFI_g \times I_g^{D50}}{ANFI_g} \tag{58}$$

$$\bar{I}_b^a = \frac{AFI_b \times I_b^{D50}}{ANFI_b} \tag{59}$$

The process 1300 then proceeds to (a modified) step 1315 where the white balance confidence statistics are determined in accordance with Equations (60), (61) and (62), as follows:

$$WBC_r = \max\left(\frac{VFI_r}{AFI_r}, \frac{VNFI_r}{ANFI_r}\right) \tag{60}$$

$$WBC_g = \max\left(\frac{VFI_g}{AFI_g}, \frac{VNFI_g}{ANFI_g}\right) \tag{61}$$

$$WBC_b = \max\left(\frac{VFI_b}{AFI_b}, \frac{VNFI_b}{ANFI_b}\right) \tag{62}$$

The white balance confidence thresholds in this alternate arrangement are set to $T_r^{WBC}=0.1$, $T_g^{WBC}=0.1$, and $T_b^{WBC}=0.1$. It is noted that the above alternate arrangement is merely one method for computing the white balance confidence statistics. Any method suitable for producing a statistical measure of the reliability of the final white point estimate of the no-flash image NFI may be used. The remainder of the alternate arrangement proceeds as described above in relation to FIG. 13.

The aforementioned preferred method(s) comprise a particular control flow. There are many other variants of the preferred method(s) which use different control flows without departing the spirit or scope of the invention. Furthermore one or more of the steps of the preferred method(s) may be performed in parallel rather sequentially.

The foregoing describes only some embodiments of the present invention, and modifications and/or changes can be made thereto without departing from the scope and spirit of the invention, the embodiments being illustrative and not restrictive.

The claims defining the invention are as follows:

1. A method of processing a captured image of a scene with a captured-image processing apparatus, said method comprising the steps of:
   determining photographic parameters of the scene with the captured-image processing apparatus;
   determining, with the captured-image processing apparatus, if the parameters meet pre-defined criteria, flash-no-flash white balance information for the captured image based on both a no-flash image of the scene captured at ambient light and on a flash-image of the scene captured using a flash illuminant;
   estimating the reliability of the determined flash-no-flash white balance information with the captured-image processing apparatus; and
   determining, with the captured-image processing apparatus, if the parameters do not meet the pre-defined criteria or the reliability is lower than a pre-defined threshold, white balance information applicable to the captured image using a default white balance method.

2. A method according to claim 1, wherein the photographic parameters comprise at least one of:
   light intensity emitted from the scene; and
   range to the focus point of the scene.

3. A method according to claim 2, wherein the pre-defined criteria comprise at least one of:
   determining if the intensity of the light emitted by the scene exceeds a first threshold; and
   determining if the range to the focus point is greater than a second threshold.

4. A method according to claim 3, wherein:
   the first threshold is four times the level of flash light reflected from a grey matte object at a distance between a camera used to capture the image and the focus point; and
   the second threshold is greater than 10 meters.

5. A method according to claim 1 further comprising the steps of:
   determining flash suitability dependent upon flash intensity relative to the ambient illumination and flash coverage; and
   determining the flash-no-flash white balance information if the flash suitability meets a pre-defined criterion.

6. A method according to claim 5 where the determination of flash suitability is based on an estimate of at least some part of an image of the scene illuminated only by the flash.

7. A method according to claim 5 further comprising the step of determining an additional suitability measure based on the effect of a first color transform on the captured image in one or more regions of the captured image.

8. An apparatus for processing a captured image of a scene, said apparatus comprising:
- means for determining photographic parameters of the scene;
- means for determining, if the parameters meet pre-defined criteria, flash-no-flash white balance information for the captured image based on both a no-flash image of the scene captured at ambient light and on a flash-image of the scene captured using a flash illuminant;
- means for estimating the reliability of the determined flash-no-flash white balance information; and
- means for determining, if the parameters do not meet the pre-defined criteria or the reliability is lower than a pre-defined threshold, white balance information applicable to the captured image using a default white balance method.

9. A computer readable storage medium having recorded thereon a computer program for directing a processor to execute a method for processing a captured image of a scene, said program comprising:
- code for determining photographic parameters of the scene; and
- code for determining, if the parameters meet pre-defined criteria, flash-no-flash white balance information for the captured image based on both a no-flash image of the scene captured at ambient light and on a flash-image of the scene captured using a flash illuminant;
- code for estimating the reliability of the determined flash-no-flash white balance information; and
- code for determining, if the parameters do not meet the pre-defined criteria or the reliability is lower than a pre-defined threshold, white balance information applicable to the captured image using a default white balance method.

* * * * *